(12) United States Patent
Merkel

(10) Patent No.: US 10,882,794 B2
(45) Date of Patent: Jan. 5, 2021

(54) ZIRCONIUM TIN TITANATE COMPOSITIONS, CERAMIC BODIES COMPRISING SAME, AND METHODS OF MANUFACTURING SAME

(71) Applicant: Corning Incorporated, Corning, NY (US)

(72) Inventor: Gregory Albert Merkel, Corning, NY (US)

(73) Assignee: Corning Incorporated, Corning, NY (US)

( * ) Notice: Subject to any disclaimer, the term of this patent is extended or adjusted under 35 U.S.C. 154(b) by 287 days.

(21) Appl. No.: 15/763,462

(22) PCT Filed: Sep. 28, 2016

(86) PCT No.: PCT/US2016/054103
§ 371 (c)(1),
(2) Date: Mar. 27, 2018

(87) PCT Pub. No.: WO2017/058865
PCT Pub. Date: Apr. 6, 2017

(65) Prior Publication Data
US 2018/0282226 A1    Oct. 4, 2018

Related U.S. Application Data

(60) Provisional application No. 62/233,736, filed on Sep. 28, 2015.

(51) Int. Cl.
*C04B 35/49*    (2006.01)
*B01D 46/24*    (2006.01)
(Continued)

(52) U.S. Cl.
CPC .......... *C04B 35/49* (2013.01); *B01D 46/2418* (2013.01); *B01D 53/94* (2013.01);
(Continued)

(58) Field of Classification Search
None
See application file for complete search history.

(56) References Cited

U.S. PATENT DOCUMENTS 4,665,041 A    5/1987   Higuchi et al.
4,758,542 A    7/1988   Parker
(Continued)

FOREIGN PATENT DOCUMENTS

JP    61261264 A    11/1986
JP    03075268 A    3/1991
(Continued)

OTHER PUBLICATIONS

Deiselnet.com; Wall-Flow Monoliths, (via wayback machine archive: https://dieselnet.com/tech/dpf_wall-flow.php dated Mar. 25, 2015) accessed May 18, 2020. (Year: 2015).*
(Continued)

*Primary Examiner* — David Sample
*Assistant Examiner* — Elizabeth Collister
(74) *Attorney, Agent, or Firm* — Kurt R. Denniston

(57) ABSTRACT

Disclosed is a microcracked ceramic body, comprising a predominant phase (greater than 50 wt %) of zirconium tin titanate and a dilatometric coefficient of thermal expansion (CTE) from 25 to 1000 C of not more than $40 \times 10^{-7}$° $C.^{-1}$ as measured by dilatometry and methods for the manufacture of the same.

20 Claims, 14 Drawing Sheets

(51) Int. Cl.
  *C04B 35/64* (2006.01)
  *C04B 35/462* (2006.01)
  *B01D 53/94* (2006.01)
  *C04B 35/63* (2006.01)

(52) U.S. Cl.
  CPC ............ *C04B 35/462* (2013.01); *C04B 35/63* (2013.01); *C04B 35/64* (2013.01); *B01D 2255/9155* (2013.01); *B01D 2279/30* (2013.01); *C04B 2235/3244* (2013.01); *C04B 2235/3249* (2013.01); *C04B 2235/3293* (2013.01); *C04B 2235/5436* (2013.01); *C04B 2235/602* (2013.01); *C04B 2235/6562* (2013.01); *C04B 2235/6565* (2013.01); *C04B 2235/6567* (2013.01); *C04B 2235/761* (2013.01); *C04B 2235/786* (2013.01); *C04B 2235/80* (2013.01); *C04B 2235/963* (2013.01); *C04B 2235/9607* (2013.01)

(56) References Cited

U.S. PATENT DOCUMENTS

| | | |
|---|---|---|
| 7,713,897 B2 | 5/2010 | Ogunwumi et al. |
| 7,932,201 B2 | 4/2011 | Ogunwumi et al. |
| 2006/0270546 A1 | 11/2006 | Wusirika |
| 2009/0142499 A1 | 6/2009 | Cecce et al. |
| 2010/0304965 A1 | 12/2010 | Boek et al. |
| 2012/0135186 A1 | 5/2012 | Beall et al. |
| 2014/0338296 A1 | 11/2014 | Backhaus-Ricoult et al. |
| 2014/0371062 A1 | 12/2014 | Merkel et al. |

FOREIGN PATENT DOCUMENTS

| | | |
|---|---|---|
| KR | 486121 B1 | 4/2005 |
| WO | 2015042499 A2 | 3/2015 |

OTHER PUBLICATIONS

Bayer et al; "Effect of Ionic Substitution on the Thermal Expansion of ZrTiO4"; J. Am. Ceram. Soc., 74 [9] (1991) 2205-2208.

Budiansky et al; "Elastic Moduli of a Cracked Solid"; Int. J. Solids. Strucutres; 1976, vol. 12; pp. 81-97.

Coughanour et al; "Phase Equilibrium Relations in the Systems Lime-Titania and Zirconia-Titania"; Journal of Research of the National Bureau of Standards; vol. 52, No. 1 Jan. 1954; Research Paper 2470; pp. 37-42.

Hirano et al; "Chemical Processing and Microwave Characteristics of [Zr,Sn]TiO4 Microwave Dielectrics"; J. Am. Ceram. Soc., 74 [6] pp. 1320-1324 (1991).

Houivet et al; "Effect of Annealing on the Microwave Properties of (Zr,Sn)TiO4 Ceramics"; Journal of the European Ceramic Society, 21 (2001) pp. 1727-1730.

Huang et al; "Effects of Additives on Microstructures and Microwave Dielectric Properties of (Zr, Sn)TiO4 Ceramics"; Materials Chemistry and Physics, 71 (2001); pp. 71-22.

Huang et al; "Liquid Phase Sintering of (Zr,Sn)TiO4 Microwave Dielectric Ceramics"; Materials Research Bulletin, 35, pp. 1881-1888 (2000).

Iddles et al; "Relationships Between Dopants, Microstructure and the Microwave Dielectric Properties of $ZrO_2$—$TiO_2$—$SnO_2$ Ceramics"; Journal of Materials Science, 27 (1992); pp. 6303-6310.

Ikawa et al; "Phase Transformation and Thermal Expansion of Zirconium and Hafnium Titanates and Their Solid Solutions"; J. Am. Ceram. Soc., 71 [2] 120-127 (1988).

International Search Report and Written Opinion of the International Searching Authority; PCT/US2016/054103; dated Dec. 15, 2016; 15 Pages; European Patent Office.

Kim et al; "Effects of Alkaline-Earth-Metal Addition on the Sinterability and Microwave Characteristics of (Zr, Sn)TiO4 Dielectrics"; J. Am. Ceram. Soc., 83 [4] (2000); pp. 1010-1012.

McHale et al; "Investigation of the Phase Transistion in ZrTiO4 and ZrTiO4—SnO2 Solid Solutions"; Communication of the American Ceramic Society; Feb. 1983; pp. C18-C20.

Sebastian; "Dielectric Materials for Wireless Communication, Chapter 4—Zirocnium Tin Titanate"; (2010) Elsevier, Oxford, UK; pp. 83-108.

Wang et al; "The Microstructure and Microwave Dielectric Properties of Zirconium Titanate Ceramics in the Solid Solution Systems ZrTiO4—Zr5Ti7O24"; Journal of Materials Science, 32 (1997) pp. 1693-1701.

Wilson et al; "Solid Solution in the ZrO2—SnO2—TiO2 System"; Transactions, vol. 88, No. 3; 1989; pp. 69-74.

Wolfram et al; "Existence Range, Structural and Dieelectric Properties of ZrXTiYSnZO4 Ceramices (X+Y+Z=2)"; Mat. Res. Bull., vol. 16, pp. 1455-1463 (1981).

English Translation of JP2018515920 Office Action dated Mar. 27, 2019, Japan Patent Office, 2 Pgs.

* cited by examiner

ZIRCONIUM TIN TITANATE COMPOSITIONS, CERAMIC BODIES COMPRISING SAME, AND METHODS OF MANUFACTURING SAME

CROSS-REFERENCE TO RELATED APPLICATIONS

This application is a national stage application under 35 U.S.C. § 371 of International Patent Application Serial No. PCT/US2016/054103, filed on Sep. 28, 2016, which claims the benefit of priority under U.S. Provisional Application Ser. No. 62/233,736 filed on Sep. 28, 2015, the contents of are relied upon and incorporated herein by reference in their entireties.

BACKGROUND

Field

Exemplary embodiments of the present disclosure relate to ceramic bodies and methods of manufacturing the same and, more particularly, to microcracked ceramic bodies including a zirconium tin titanate phase, and methods of manufacturing the same.

Discussion of the Background

Materials for use in high-temperature applications that are subject to thermal gradients require thermodynamic stability under use conditions; resistance to oxidizing and, in some cases, reducing atmospheres; high melting point; minimal change in dimensions after many thermal cycles; and high thermal shock resistance, usually by virtue of a low coefficient of thermal expansion (CTE). The number of ceramic materials whose properties satisfy these requirements can be limited, and instances can occur in which other demands of the application necessitate certain other specific properties of the ceramic material. For example, in applications related to engine exhaust after-treatment, the ceramic must possess chemical durability in the presence of other metal oxides that may be either applied to the ceramic to enhance its functionality (for example, catalysts) or come into contact with the ceramic as a component of the external environment (for example, ash from combustion of impurities or additives in fuels).

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a ceramic body comprising a predominant phase of zirconium tin titanate.

Exemplary embodiments of the present disclosure also provide a method of manufacturing a ceramic body comprising a predominant phase of zirconium tin titanate.

Additional features of the disclosure will be set forth in the description which follows, and in part will be apparent from the description, or may be learned by practice of the disclosure.

An exemplary embodiment discloses a microcracked ceramic body, comprising: a predominant phase of zirconium tin titanate; a microcrack density; and a dilatometric coefficient of thermal expansion (CTE) from 25 to 1000° C. of not more than $40 \times 10^{-7}$ °C.$^{-1}$ as measured by dilatometry.

Another exemplary embodiment discloses a method of manufacturing a microcracked ceramic body. The method comprises providing an inorganic batch composition comprising a zirconium oxide powder, a titanium oxide powder, and a tin oxide powder, wherein the median particle size of at least two of the oxide powders is at least 5 µm and wherein the sum of the weight percentages of the zirconium oxide powder, titanium oxide powder, and tin oxide powder is sufficient to provide more than 50 weight percent of a zirconium tin titanate phase in the microcracked ceramic body. The method comprises mixing the inorganic batch composition together with one or more processing aids selected from the group consisting of a plasticizer, lubricant, binder, pore former, and solvent, to form a plasticized ceramic precursor batch composition, and shaping the plasticized ceramic precursor batch composition into a green body. The method comprises firing the green body under conditions effective to convert the green body into the microcracked ceramic body comprising a predominant phase of zirconium tin titanate. The mol % of each of $ZrO_2$, $SnO_2$ and $TiO_2$ components in the zirconium tin titanate phase is expressed as $40 \leq Z \leq 65$, $13 \leq S \leq 50$, and $5 \leq T \leq 30$, where $Z=100(\text{mol }\% \text{ } ZrO_2)/(\text{mol }\% \text{ } ZrO_2+\text{mol }\% \text{ } SnO_2+\text{mol }\% \text{ } TiO_2)$, $S=100(\text{mol }\% \text{ } SnO_2)/(\text{mol }\% \text{ } ZrO_2+\text{mol }\% \text{ } SnO_2+\text{mol }\% \text{ } TiO_2)$, and $T=100(\text{mol }\% \text{ } TiO_2)/(\text{mol }\% \text{ } ZrO_2+\text{mol }\% \text{ } SnO_2+\text{mol }\% \text{ } TiO_2)$, a minimum lattice CTE ($CTE_{min}$) from 25 to 1000° C. of the zirconium tin titanate phase is not more than $30 \times 10^{-7}$ °C.$^{-1}$, and a zirconium tin titanate grain size parameter, g, in units of micrometers (µm) is $g \geq k_2[4.15+ 1.99 \times 10^6 (CTE_{min}) + 3.58 \times 10^{11} (CTE_{min})^2 + 2.15 \times 10^{16} (CTE_{min})^3]$, wherein $k_2 \geq CTE_{min}$ is in units of °C.$^{-1}$, and the grain size parameter is determined by a line intercept method applied to an image of the ceramic microstructure and is defined as $g=L/p$ where p is the number of grain boundaries intercepted by one or more straight lines of total length L or one or more circles of total circumference L, wherein L is in units of micrometers and L is chosen such that the value of L/g is at least 25 in order to provide adequate counting statistics for calculation of the grain size parameter.

It is to be understood that both the foregoing general description and the following detailed description are exemplary and explanatory and are intended to provide further explanation of the disclosure.

BRIEF DESCRIPTION OF THE FIGURES

The accompanying drawings, which are included to provide a further understanding of the disclosure and are incorporated in and constitute a part of this specification, illustrate exemplary embodiments of the disclosure, and together with the description serve to explain the principles of the disclosure.

FIG. 12 is a plot of $\Delta L/L$ versus temperature on heating and the predicted thermal shock limit for exemplary Example F6a of nearly four times the predicted thermal shock limit for comparative Example D6a.

FIG. 13 is a plot of $\Delta L/L$ versus temperature on heating and the predicted thermal shock limit for exemplary Example M6a of over four times the predicted thermal shock limit for comparative Example D6a FIG. 14 is a plot of $\Delta L/L$ versus temperature on heating and the predicted thermal shock limit for exemplary Example P6a of nearly four times the predicted thermal shock limit for comparative Example D6a.

DETAILED DESCRIPTION

It will be understood that for the purposes of this disclosure, "at least one of X, Y, and Z" can be construed as X only, Y only, Z only, or any combination of two or more items X, Y, and Z (e.g., XYZ, XY, YZ, XZ).

Figure 1:
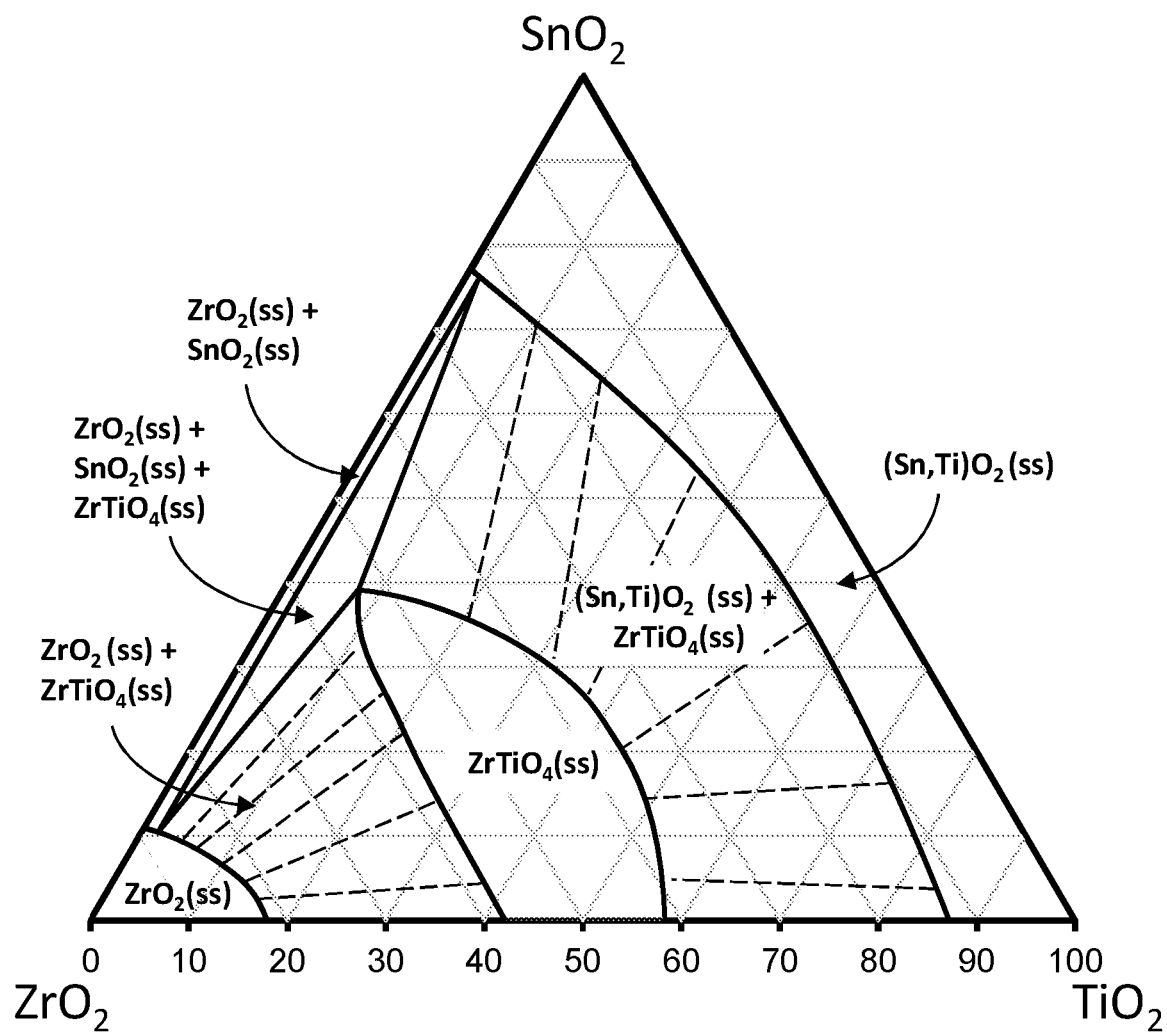
FIG. 1 depicts the approximate phase relations in the $ZrO_2$—$TiO_2$—$SnO_2$ system at 1500-1600° C. as determined by the present investigation, including the approximate limits of the composition of the zirconium tin titanate phase ($ZrTiO_4$ solid solution (ss)), zirconium oxide phase ($ZrO_2$ (ss)), and tin oxide-titanium oxide (cassiterite-rutile) phase ($SnO_2$ (ss) and $(Sn,Ti)O_2$ (ss)). All compositions are in mole percent. Phase composition boundaries are denoted by solid curves. Solid and dashed lines indicate approximate orientations of tie lines joining the compositions of coexisting phases.

Among refractory oxide materials, zirconium titanate, $ZrTiO_4$, has received attention for its dielectric properties since the 1940s, and in the 1970s it was discovered that further improvement in dielectric properties could be gained through the partial substitution of tin (Sebastian, M. T. (2010) Dielectric Materials for Wireless Communication (Chapter 4—Zirconium Tin Titanate), Elsevier, Oxford, UK). The limit of tin solubility in the zirconium titanate phase at high temperatures was determined by several studies in the 1980s (Wolfram, G. and Goebel, H. E. (1981) "Existence range, structural and dielectric properties of $Zr_xTi_ySn_zO_4$ ceramics (x+y+z=2)," *Mat. Res. Bull.*, 16, 1455-1463; Wilson, G. and Glasser, F. P. (1989) Solid solution in the $ZrO_2$—$SnO_2$—$TiO_2$ system, *Br. Ceram. Trans. J.*, 88 [3] 69-74). The approximate phase relations and extent of solid solution of the zirconium tin titanate phase at 1500-1600° C. determined by the present investigation is shown in FIG. 1.

Although $ZrTiO_4$ is known to have a melting point in excess of 1800° C. (Coughanour, L. W., Roth, R. S., DeProsse, V. A. (1954) Phase Equilibrium Relations in the Systems Lime-Titania and Zirconia-Titania, *Journal of Research of the National Bureau of Standards*, 52 [1] 37-42), its very high coefficient of thermal expansion precludes its use in thermal shock environments. Ikawa et al. (Ikawa et al. (1988) "Phase Transformation and Thermal Expansion of Zirconium and Hafnium Titanates and Their Solid Solutions" *J. Am. Ceram. Soc.* 71 [2] 120-127) prepared polycrystalline bodies of $ZrTiO_4$ by co-precipitation of mixed oxides and reaction sintering of the powders at 1600° C., and determined the CTE (RT—1000° C.) to be $81 \times 10^{-7}$ °$C.^{-1}$ by dilatometry. Bayer et al. (Bayer et al. (1991) "Effect of Ionic Substitution on the Thermal Expansion of $ZrTiO_4$" *J. Am. Ceram. Soc.*, 74 [9] 2205-2208) reacted mixtures of fine metal oxides to form $ZrTiO_4$ at 1600° C. and similarly found the coefficient of thermal expansion (25-1000° C.) of the ceramic body to be $82\times10^{-7\circ}$ C.$^{-1}$. It was also found that the CTE of zirconium titanate ceramics could be reduced by the substitution of tin. Thus, Ikawa et al. (1988) reported the CTEs of $Zr_{0.7}Sn_{0.3}TiO_4$ and $ZrTi_{0.4}Sn_{0.6}O_4$ ceramics to be 68 and $48\times10^{-7\circ}$ C.$^{-1}$, respectively, while Bayer et al. (1991) determined the CTE of a $ZrTi_{0.5}Sn_{0.5}O_4$ ceramic to be $68\times10^{-7\circ}$ C.$^{-1}$ and that of a $ZrTi_{0.4}Sn_{0.6}O_4$ body to be $48\times10^{-7\circ}$ C.$^{-1}$, all as measured by dilatometry.

Despite reduction in the CTE of zirconium titanate by the substitution of tin demonstrated in the prior art, CTE values remain higher than desired for use in thermal shock environments. A further reduction in the mean CTE from 25-1000° C. to less than $40\times10^{-7\circ}$ C.$^{-1}$, and even more preferably less than $30\times10^{-7\circ}$ C.$^{-1}$, in zirconium tin titanate ceramic bodies would promote their consideration as new highly refractory materials for thermal shock applications.

Exemplary embodiments of the present disclosure relate to microcracked ceramic bodies (articles) comprising a predominant phase of zirconium tin titanate and having a mean coefficient of thermal expansion over the temperature interval of 25 to 1000° C. of not more than $40\times10^{-7\circ}$ C.$^{-1}$ as measured by dilatometry. Previous zirconium tin titanate bodies reported in the prior art exhibit a CTE (25-1000° C.) of more than $45\times10^{-7\circ}$ C.$^{-1}$. The lower CTE values of the exemplary bodies of the present disclosure can be achieved by selecting a composition wherein the zirconium tin titanate phase contains not more than 30 mol % $TiO_2$ and selecting a combination of raw materials and a firing temperature and time that enable sufficient grain growth to cause microcracking. Predominant as used herein refers to more than 50 wt % of the ceramic body. Microcracked, low-titanium zirconium tin titanate bodies have not been known prior to the present disclosure.

An exemplary embodiment of the present disclosure relates to a microcracked ceramic body comprising a predominant phase of zirconium tin titanate and having a coefficient of thermal expansion (25-1000° C.) of not more than about $40\times10^{-7\circ}$ C.$^{-1}$ as measured by dilatometry. In preferred embodiments, the dilatometric CTE from 25 to 1000° C. of the exemplary microcracked ceramic bodies is not more than $35\times10^{-7\circ}$ C.$^{-1}$, not more than $30\times10^{-7\circ}$ C.$^{-1}$, and even not more than $25\times10^{-7\circ}$ C.$^{-1}$. When the microcracked ceramic body has a honeycomb structure, the coefficient of thermal expansion is measured parallel to the length of the channels on a bar cut from the ceramic body. The zirconium tin titanate phase is a phase having a crystal structure based upon one or more of the crystal structures displayed by the compound $ZrTiO_4$ and containing tin in addition to titanium and zirconium.

Figure 2:
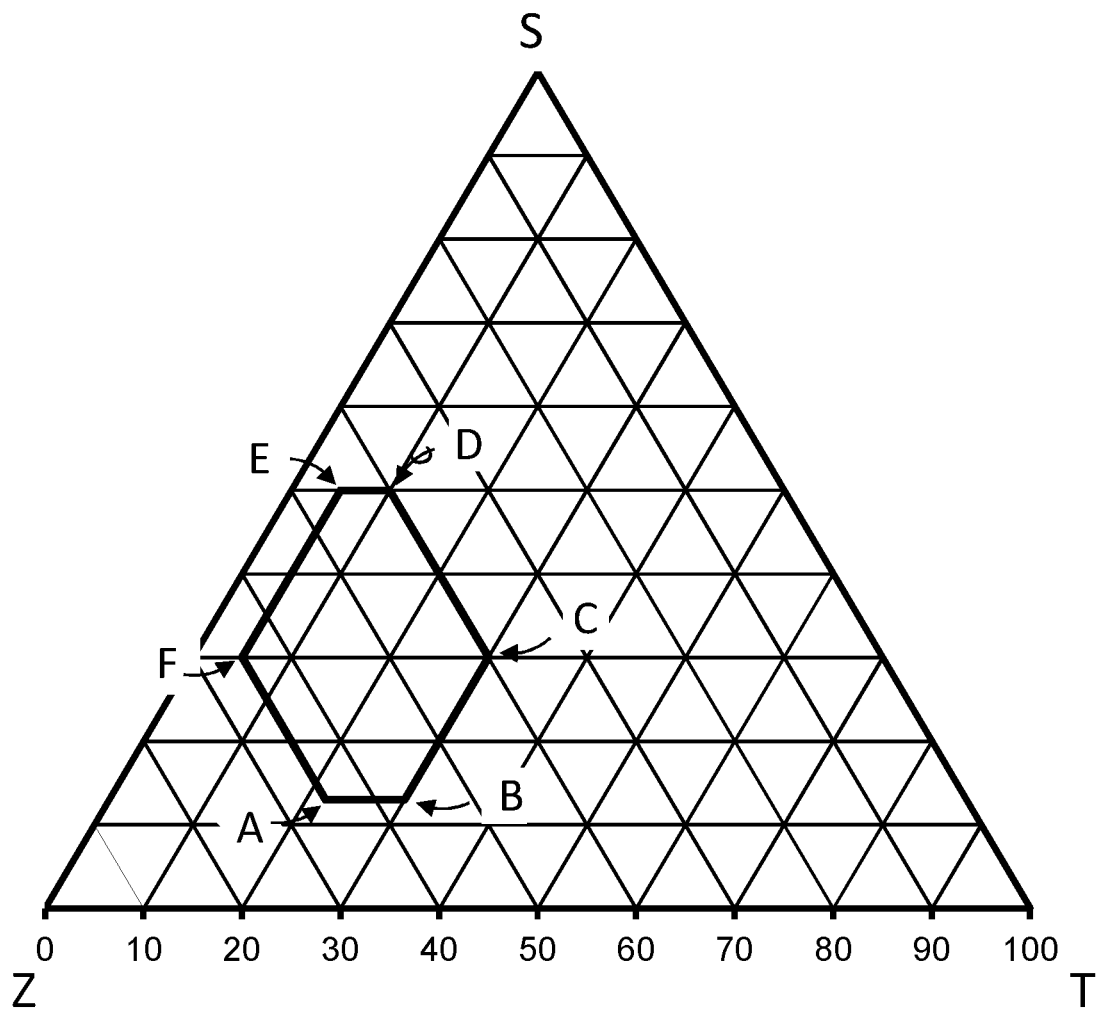
FIG. 2 shows the compositional limits A-B-C-D-E-F of the zirconium tin titanate phase in exemplary embodiments of the present disclosure, on a mole percent basis, projected onto the $ZrO_2$—$TiO_2$—$SnO_2$ ternary compositional diagram (sum of mole percentages of $ZrO_2$, $TiO_2$ and $SnO_2$ components in the zirconium tin titanate phase normalized to 100%).
Figure 3:
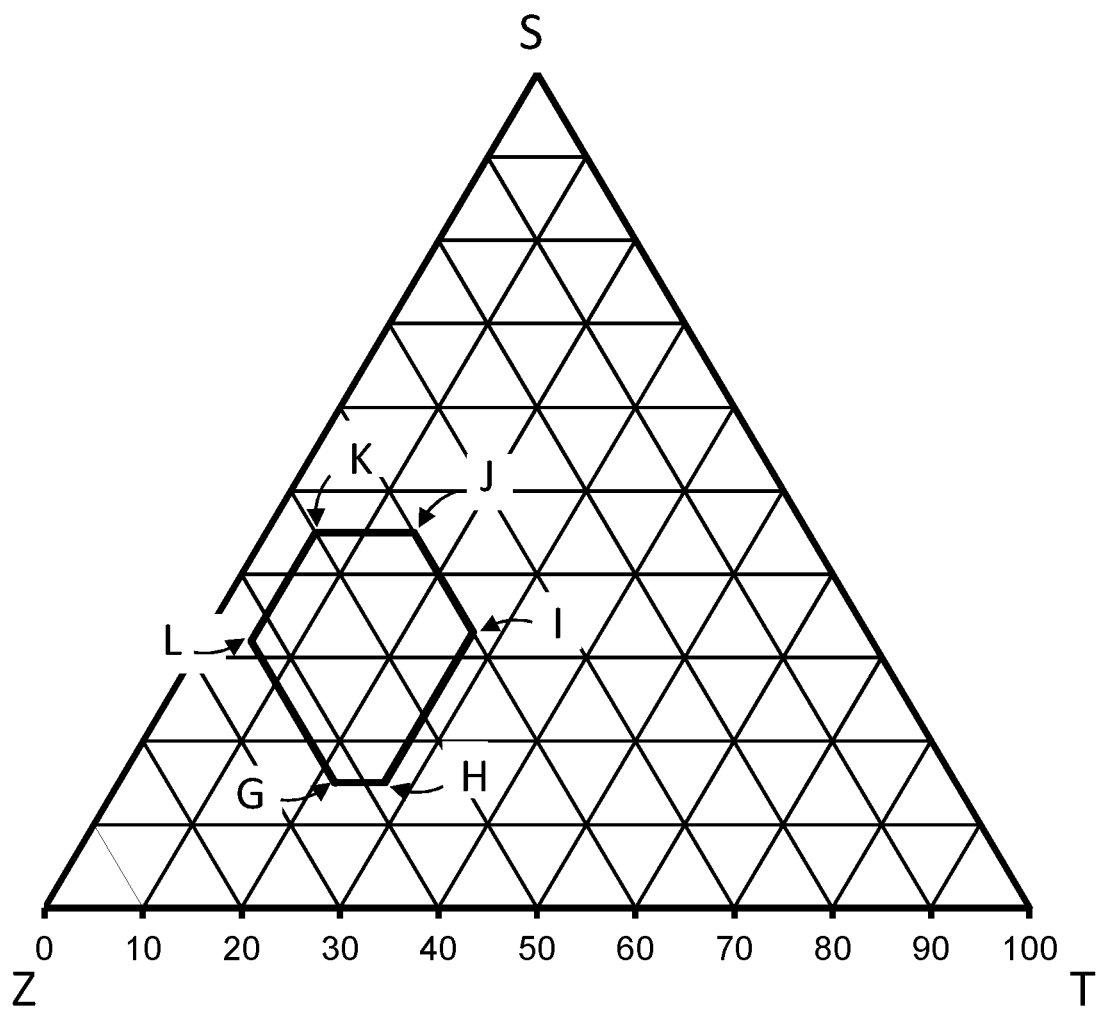
FIG. 3 shows the compositional limits G-H-I-J-K-L of the zirconium tin titanate phase in other exemplary embodiments of the present disclosure, on a mole percent basis, projected onto the $ZrO_2$—$TiO_2$—$SnO_2$ ternary compositional diagram (sum of mole percentages of $ZrO_2$, $TiO_2$ and $SnO_2$ components in the zirconium tin titanate phase normalized to 100%).
Figure 4:
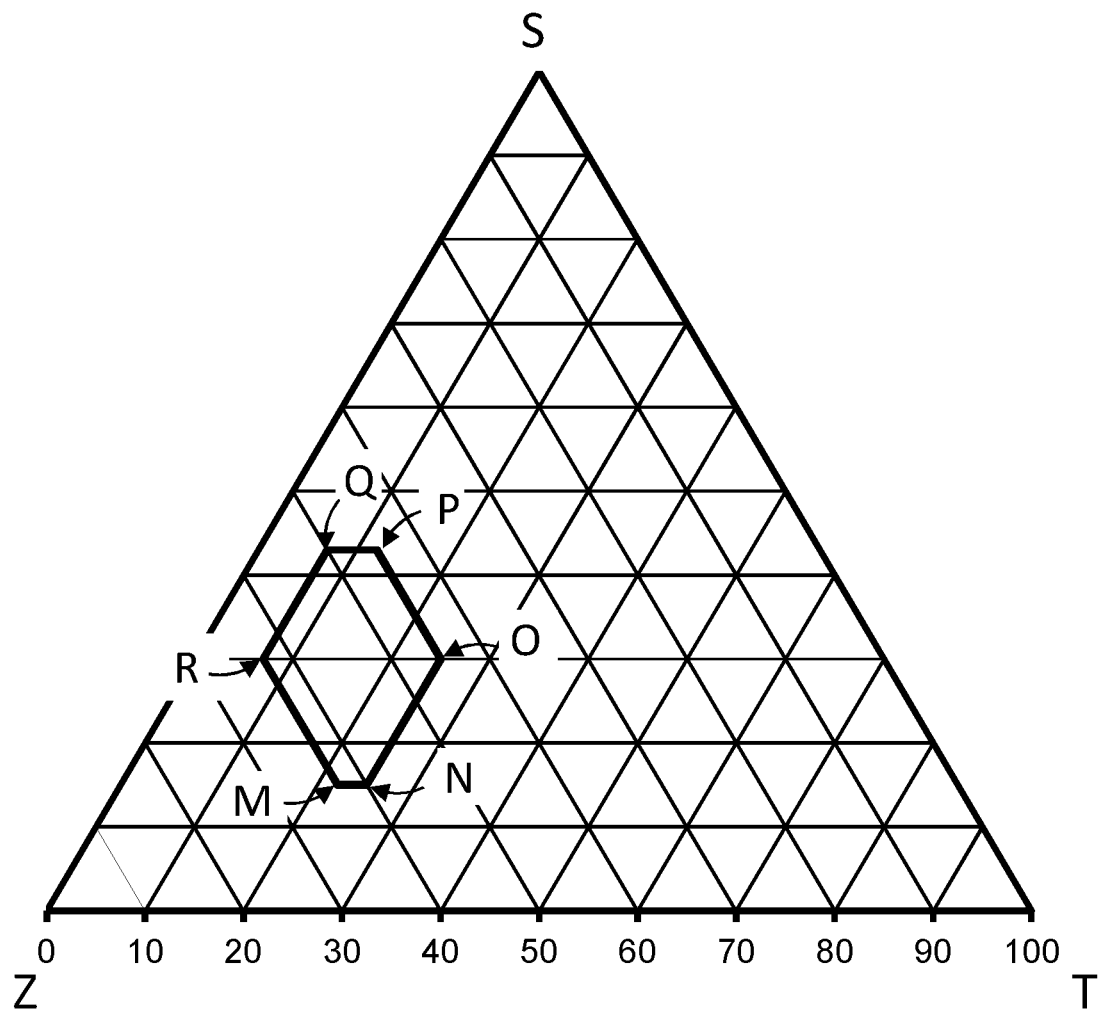
FIG. 4 shows the compositional limits M-N-O-P-Q-R of the zirconium tin titanate phase in preferred exemplary embodiments of the present disclosure, on a mole percent basis, projected onto the $ZrO_2$—$TiO_2$—$SnO_2$ ternary compositional diagram (sum of mole percentages of $ZrO_2$, $TiO_2$ and $SnO_2$ components in the zirconium tin titanate phase normalized to 100%).

In certain preferred embodiments, the composition of the zirconium tin titanate phase of the ceramic body fulfills the requirement that $40 \leq Z \leq 65$, $13 \leq S \leq 50$, and $5 \leq T \leq 30$, where $Z=100(\text{mol \%} ZrO_2)/(\text{mol \%} ZrO_2+\text{mol \%} SnO_2+\text{mol \%} TiO_2)$, $S=100(\text{mol \%} SnO_2)/(\text{mol \%} ZrO_2+\text{mol \%} SnO_2+\text{mol \%} TiO_2)$, and $T=100(\text{mol \%} TiO_2)/(\text{mol \%} ZrO_2+\text{mol \%} SnO_2+\text{mol \%} TiO_2)$, in which the mol % (mole percent) of each component is its mole percentage in the zirconium tin titanate phase, and in which the other chemical components of the zirconium tin titanate phase, if any, are expressed as the simple metal oxides (binary compounds of one metal with oxygen). This preferred compositional range of the zirconium tin titanate phase is depicted in FIG. 2. In other preferred embodiments, the composition of the zirconium tin titanate phase fulfills the requirement that $40 \leq Z \leq 63$, $15 \leq S \leq 45$, and $5 \leq T \leq 27$, as shown in FIG. 3. In especially preferred embodiments, the composition of the zirconium tin titanate phase fulfills the requirement that $45 \leq Z \leq 63$, $15 \leq S \leq 43$, and $7 \leq T \leq 25$, as shown in FIG. 4.

In some of these exemplary embodiments the predominant phase of zirconium tin titanate phase is at least 60 wt % of the ceramic body. For example, the zirconium tin titanate phase is at least 70 wt % of the ceramic body. For example, the zirconium tin titanate phase is at least 80 wt % of the ceramic body. For example, the zirconium tin titanate phase is at least 90 wt % of the ceramic body. For example, the zirconium tin titanate phase is at least 95 wt % of the ceramic body. For example, the zirconium tin titanate phase is even at least 99 wt % of the ceramic body.

The zirconium tin titanate phase may also contain minor amounts of other substituents such as Hf, Al, Ga, Fe, Cr, Mn, Ta, Nb, In, and Sb, preferably not to exceed 5 cation percent and more preferably not to exceed 1 cation percent of the zirconium tin titanate phase. Other phases may be present in the body, such as one or more of a zirconium oxide based phase and a tin oxide based phase. The zirconium oxide based phase can include titanium and tin in solid solution and may optionally include minor amounts of other substituents such as Ce, Y, Ca, Mg, Fe, Hf, etc., and can be a monoclinic baddeleyite-type phase at room temperature (RT), which is about 25° C. Where a baddeleyite-type phase is present, it preferably undergoes a transformation to a tetragonal crystal structure at a temperature of less than 1000° C. during heating. The tin oxide based phase can include titanium and zirconium in solid solution and may contain minor amounts of other substituents such as Fe, Ta, Nb, Zn, W, Mn, Sc, Ge, In, Ga, etc.

The atomic crystal lattice of the zirconium tin titanate phase is based upon that of $\alpha\text{-PbO}_2$ and belongs to the space group Pbcn. The symmetry is orthorhombic with a unit cell having an a axis, b axis, and c axis orthogonal to one another. Each of these three unit cell parameters exhibits a different coefficient of thermal expansion from one another, CTE(a), CTE(b), and CTE(c), which are referred to as the lattice axial CTE values or simply axial CTE values. These lattice axial CTE values vary with the composition of the zirconium tin titanate compound. The average of the three axial CTE values is referred to as the mean lattice axial CTE or mean lattice CTE. The lowest axial CTE value for a zirconium tin titanate compound of a given composition is referred to as the minimum axial CTE value, $CTE_{min}$, and can be found to be the b-axis CTE, CTE(b). The highest axial CTE value for a zirconium tin titanate compound of a given composition is referred to as the maximum axial CTE value, $CTE_{max}$, and can be found to be the a-axis CTE, CTE(a). The difference between the highest and lowest axial CTE values for a given zirconium tin titanate compound is referred to as the maximum lattice CTE anisotropy, or simply the CTE anisotropy, of the phase, $\Delta CTE_{max}$. The lattice axial CTE values of the zirconium tin titanate phase are determined by measuring the dimensions of the three unit cell parameters over a series of temperatures by high-temperature x-ray diffractometry, and the CTE values are defined here as the mean ("secant") CTE values from 25 to 1000° C.

In exemplary embodiments of the present disclosure, the lowest crystal lattice axial CTE value of the zirconium tin titanate phase, $CTE_{min}$, must be not greater than $30\times10^{-7\circ}$ C.$^{-1}$, for example, is not greater than $20\times10^{-7\circ}$ C.$^{-1}$, not greater than $10\times10^{-7\circ}$ C.$^{-1}$, not greater than $0\times10^{-7\circ}$ C.$^{-1}$, not greater than $-10\times10^{-7\circ}$ C.$^{-1}$, and even not greater than $-20\times10^{-7\circ}$ C.$^{-1}$. The crystal lattice CTE anisotropy of the zirconium tin titanate phase is preferably at least $60\times10^{-7\circ}$ C.$^{-1}$, and more preferably at least $80\times10^{-7\circ}$ C.$^{-1}$, for example, at least 100×10⁻⁷ °C.⁻¹, at least 110×10⁻⁷ °C.⁻¹, at least 120×10⁻⁷ °C.⁻¹, at least 130×10⁻⁷ °C.⁻¹, and even at least 140×10⁻⁷ °C.⁻¹. It is found that lattice axial CTE values for zirconium tin titanate compounds naturally vary with composition in such a way that the minimum axial CTE value tends to decrease as the lattice axial CTE anisotropy increases.

A ceramic body comprising very fine grains of a zirconium tin titanate phase can have a bulk CTE, as measured by dilatometry, that is equal to, or nearly equal to, the mean lattice axial CTE of the zirconium tin titanate phase. However, when the CTE anisotropy of the zirconium tin titanate phase is high, stresses will develop between adjacent grains having different crystallographic orientations within the microstructure during cooling of the ceramic after firing. For a CTE anisotropy of a given magnitude, if the grain size of the zirconium tin titanate phase is sufficiently large, these stresses result in the formation of microcracks throughout the ceramic body. The microcracks tend to form generally orthogonal to the directions of highest lattice axial CTE because these directions undergo the greatest contraction during cooling and thereby develop the highest tensional stresses. As a result of the microcracking, the highest axial CTE directions in the adjacent zirconium tin titanate grains are no longer in contact with one another. Consequently, during reheating of the ceramic, the microcracks serve as "expansion joints" whereby the expansion of the zirconium tin titanate grains along the direction of the highest axial CTE is accommodated by a re-closing of the microcracks. By this mechanism, the bulk CTE of the ceramic, as measured by dilatometry, is reduced to a value that is less than the mean lattice axial CTE. With progressively greater microcracking and the resulting "decoupling" of the highest, and even the second-highest, axial CTE values from the bulk CTE, the coefficient of thermal expansion of the ceramic body approaches the value of the minimum axial CTE value, $CTE_{min}$. Accordingly, in order to achieve a dilatometric $CTE_{25-1000°\ C.} \leq 40 \times 10^{-7}$ °C.⁻¹ in the zirconium tin titanate-containing ceramic, the minimum lattice axial CTE must be not more than 30×10⁻⁷ °C.⁻¹ and the ceramic body must be microcracked so as to reduce the dilatometric CTE of the bulk ceramic to 40×10⁻⁷ °C.⁻¹. Microcracked bodies comprising a predominant zirconium tin titanate phase having a $CTE_{min}$ 30×10⁻⁷ °C.⁻¹ have not been previously disclosed.

The extent of microcracking may be quantified by either of two methods as disclosed herein. In accordance with one method, the "microcrack index," also referred to as "microcrack density," may be determined by stereological analysis of a scanning electron microscopy image of a polished cross section of the ceramic. The magnification of the image is selected such that the microcrack traces are clearly visible while still imaging as many microcracks in the field of view as is practical. In the first step of the analysis, the microcrack traces are identified and their number is counted over the entire area of the micrograph, yielding the value n. Either an array of parallel lines or a set of at least three concentric circles is then superimposed on the SEM image of the microstructure and the points at which the lines or circles intersect the microcrack traces are identified and counted to yield the value p. The total of the lengths of all of the lines in the array (length of one line multiplied by the number of lines drawn on the image), or the total length of the sum of the circumferences of the circles, is then calculated as the value L in units of μm (microns). The number of intercept points per unit length, $P_L$, is calculated as the value of p/L in units of μm⁻¹. From stereological principles, the total lengths of the 2D microcrack traces per unit area of the SEM image is computed as $L_A=(\pi/2)P_L$ in units of μm/μm² (or μm⁻¹). The mean length of the individual 2D microcrack traces is then calculated as $\langle 1 \rangle = L_A(A/n)$ where A is the area of the entire micrograph image over which n was counted, in units of μm². The value of $\langle 1 \rangle$ is in units of μm. The value of $\langle 1 \rangle$ is then divided by two to obtain the mean 2D microcrack trace half-length, $\langle 1 \rangle /2$, and this value is then multiplied by 4/π to obtain the mean 3D microcrack half-length, $b=(4/\pi)\langle 1 \rangle/2$ in units of μm. This value of b is equated to the radius of a disc-shaped microcrack. Finally, the total number of microcracks per unit volume (that is, in 3D), is defined as $N=(2n/A)/(\pi b)$ in units of cracks/μm³. After substituting terms and simplifying the form of the equation, the value of the microcrack index, or microcrack density, $(Nb^3)_{IA}$, where the subscript "IA" indicates derivation of the $Nb^3$ value from image analysis, can then be computed according to the following Equation 1:

$$(Nb^3)_{IA}=2(P_L)^2/(\pi n/A) \quad (Eq\ 1)$$

For accuracy, when the sample contains more than about 10% porosity, the total area over which the crack traces are counted and the total length of all the lines or circumferences over which the number of intersections with crack traces are counted should be reduced by the fraction of porosity contained within the count area or intercepted by the lines or circles.

The second method for assessing the microcrack density is based upon measurement of the Young's elastic modulus of the ceramic body from room temperature to 1200° C. and back to room temperature again. During heating, the microcracks in the ceramic gradually close. As the opposing surfaces of each crack come into contact and, at high temperatures, anneal shut, the resulting stiffening of the body is manifested by an increase in the elastic modulus. During cooling, there can be a temperature interval over which the elastic modulus undergoes a small, linear increase with decreasing temperature before the microcracks reopen at lower temperature, whereupon the elastic modulus decreases toward its initial, pre-heated value. Extrapolation of a tangent line to this linear portion of the cooling curve to 25° C. establishes the value of the elastic modulus of the sample at room temperature in a hypothetically non-microcracked state. This extrapolated value is designated $E°_{25}$. By applying the theoretical model of Budiansky and O'Connell (Budiansky, B. and O'Connell, R. J. (1976) Elastic moduli of a cracked solid, *Int. J. Solids Structures*, 12, 81-97), the microcrack density, $(Nb^3)_{EM}$, where the subscript "EM" indicates derivation from the elastic modulus measurements, can be estimated from the ratio of the elastic modulus of the microcracked sample measured at room temperature before heating, $E_{25}$, to the value $E°_{25}$ extrapolated from the linear portion of the E vs. T cooling curve, via the following Equation 2:

$$(Nb^3)_{EM}=(9/16)[1-(E_{25}/E°_{25})] \quad (Eq\ 2)$$

The extent of microcracking that is required to achieve a dilatometric $CTE_{25-1000°\ C.} \leq 40 \times 10^{-7}$ °C.⁻¹ when the mean lattice $CTE_{25-1000°\ C.}$ is >40×10⁻⁷ °C.⁻¹ is related to the minimum lattice axial CTE. Specifically, the amount of microcracking required to achieve a dilatometric $CTE_{25-1000°\ C.} \leq 40 \times 10^{-7}$ °C.⁻¹ is greater for compositions with high values of $CTE_{min}$ nearer to 30×10⁻⁷ °C.⁻¹. Zirconium tin titanate compositions with very low values of $CTE_{min}$ require less microcracking to achieve a dilatometric $CTE_{25-1000°\ C.} \leq 40 \times 10^{-7}$ °C.⁻¹, although microcracking is still required.

Figure 5:
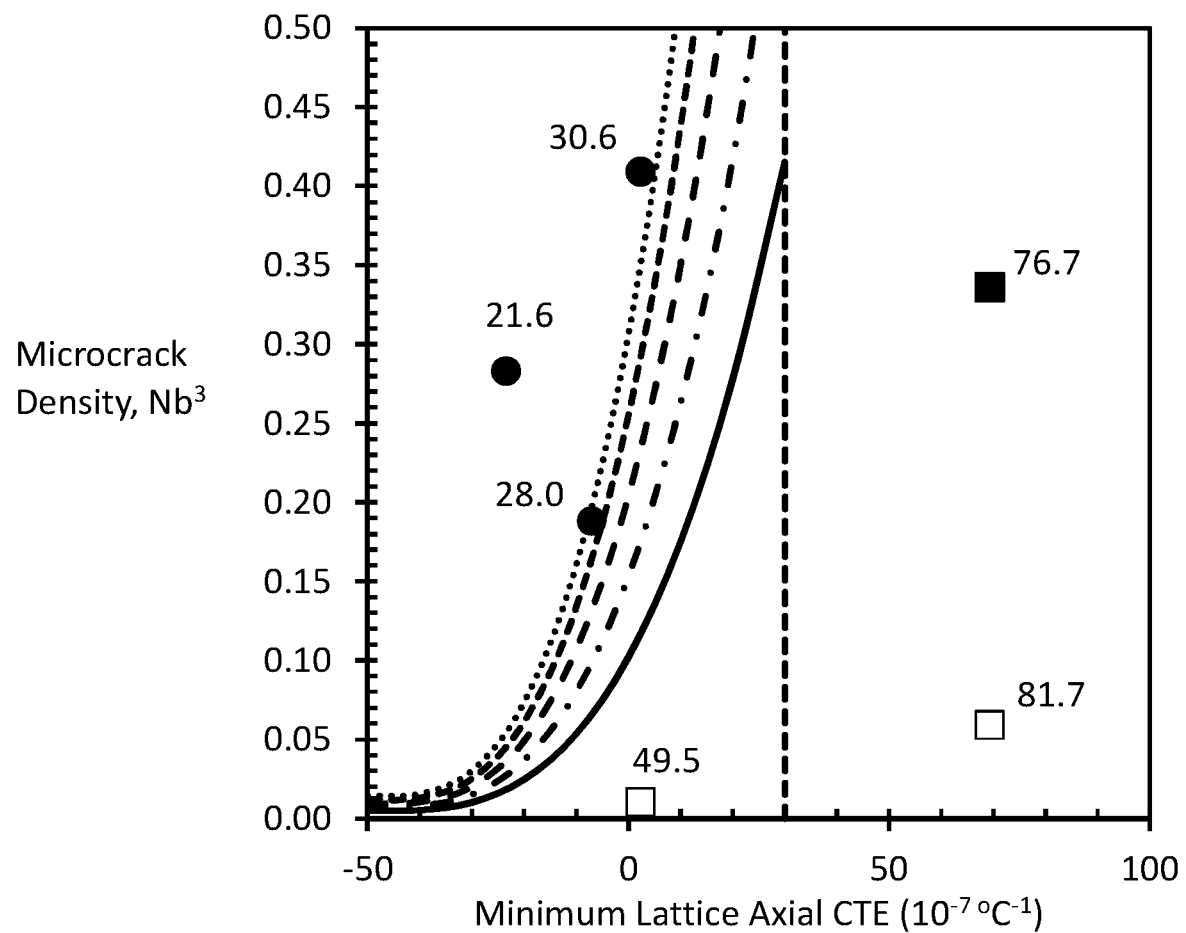
FIG. 5 is a plot of the microcrack index, $Nb^3$, of the ceramic body versus the minimum lattice axial coefficient of thermal expansion ($CTE_{min}$) from room temperature (RT) to 1000° C. of the zirconium tin titanate phase. Filled symbols denote examples fired at 1600° C., open symbols denote examples fired at 1400° C., circles denote exemplary bodies of the disclosure, squares denote comparative bodies. Data are for $Nb^3$ determined by image analysis. The boundary denoted by the solid curve defines the lower limit for the microcrack index required to achieve a dilatometric $CTE_{25-1000° C.} \leq 40 \times 10^{-7}$ °$C.^{-1}$, corresponding to Eq. 6 with $k_1=1.0$. Other boundary curves correspond to values of $k_1=1.5$ (dash-dotted), 2.0 (long dashed), 2.5 (short dashed), and 3.0 (dotted). Dashed vertical line denotes the maximum limit for $CTE_{min}$ of the zirconium tin titanate phase.

In exemplary embodiments of the disclosure, the microcrack density of the ceramic body as determined by at least one of the above two methods fulfills the following Equation 3:

$$Nb^3 \geq k_1[0.102 + 6.00 \times 10^4 (CTE_{min}) + 1.23 \times 10^{10} (CTE_{min})^2 + 8.38 \times 10^{14} (CTE_{min})^3] \quad (Eq\ 3)$$

Where $k_1$ is $\geq 1.0$. In preferred exemplary embodiments, $k_1$ is at least 1.5, at least 2.0, at least 2.5, and even at least 3.0. The lower limit for $Nb^3$ defined by Equation 3 (Eq 3) for $k_1=1.0$ is plotted against the value of $CTE_{min}$ in FIG. 5. Thus, for example, if the value of $CTE_{min}$ for the zirconium tin titanate phase in a given exemplary ceramic body is $10 \times 10^{-7\circ}$ C.$^{-1}$, then the microcrack index required to achieve a dilatometric CTE of less than $40 \times 10^{-7\circ}$ C.$^{-1}$ must be at least 0.175. Also plotted in FIG. 5 are other preferred lower limits for $Nb^3$ corresponding to values of $k_1=1.5$, 2.0, 2.5, and 3.0.

The extent of microcracking that occurs within the zirconium tin titanate ceramic is proportional to the maximum lattice CTE anisotropy and the grain size of the ceramic. For a given grain size, a change in the composition of the zirconium tin titanate phase that results in a higher CTE anisotropy will result in more microcracking and a higher value of $Nb^3$. Likewise, for a zirconium tin titanate ceramic of a given composition and CTE anisotropy, a larger grain size will result in more microcracking and a lower dilatometric CTE.

The grain size parameter, g, of the zirconium tin titanate phase is determined by a line intercept method applied to an optical or scanning electron microscopy image of a polished section of the ceramic in which the grains are distinguishable from one another, and represents the average of the widths of the grains measured at random positions across the grains in the two-dimensional image. For example, the grain size parameter may be measured according to the "Abrams Three-Circle Procedure" as described in ASTM E112-13. The term "grain size parameter" herein refers to the average intercept length of the grains on the two-dimensional polished section. In practice, the value of g is calculated from the relation in the following Equation 4:

$$g = L/p \quad (Eq\ 4)$$

Where p is the number of intercepts between the grain boundaries and an array of lines of total length L or between the grain boundaries and one or more circles whose circumferences total to a length L, where L is in units of micrometers. In practice, it is preferred that the magnification of the optical or scanning electron microscopy image and the number of lines or circles drawn on that image are selected so as to yield a value of L/g of at least 25, and more preferably at least 50, in order to provide adequate counting statistics for calculation of the grain size parameter.

Figure 6:
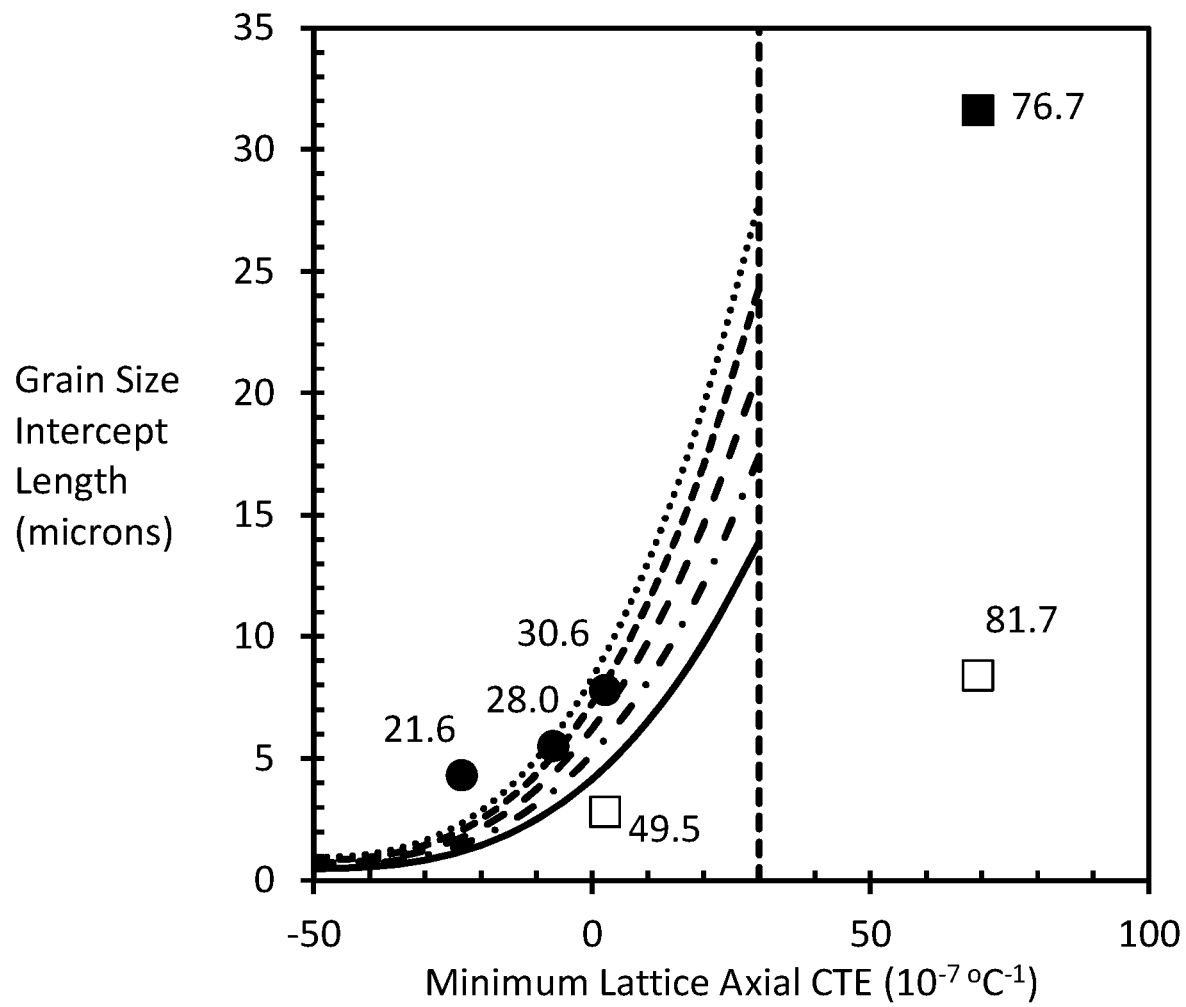
FIG. 6 is a plot of the grain size parameter (average linear intercept length) of the zirconium tin titanate phase versus the minimum lattice axial CTE ($CTE_{min}$) of that phase. Filled symbols denote examples fired at 1600° C., open symbols denote examples fired at 1400° C., circles denote exemplary bodies of the disclosure, squares denote comparative bodies. The boundary denoted by the solid curve defines the lower limit for the grain size parameter required to achieve a dilatometric $CTE_{25-1000° C.} \leq 40 \times 10^{-7}$ °$C.^{-1}$, corresponding to Eq. 8 with $k_2=1.0$. Other boundary curves correspond to values of $k_2=1.25$ (dash-dotted), 1.50 (long dashed), 1.75 (short dashed), and 2.0 (dotted).

In accordance with an exemplary embodiment of the disclosure, it has been determined that the minimum value of the grain size parameter (in units of microns), required to provide sufficient microcracking to yield a CTE<$40 \times 10^{-7\circ}$ C.$^{-1}$ is related to the minimum lattice axial CTE (in units of $^\circ$ C.$^{-1}$) according to the following Equation 5:

$$g \geq k_2[4.15 + 1.99 \times 10^6 (CTE_{min}) + 3.58 \times 10^{11} (CTE_{min})^2 + 2.15 \times 10^{16} (CTE_{min})^3] \quad (Eq\ 5)$$

Where $k_2$ is $\geq 1.0$. In embodiments, $k_2$ is at least 1.25, for example, at least 1.50, at least 1.75, and even at least 2.00. The lower limit for the preferred values of g calculated from Eq. 5 ($k_2=1.0$) is plotted against the value of $CTE_{min}$ in FIG. 6. Thus, for example, if the value of $CTE_{min}$ for the zirconium tin titanate phase in a given exemplary ceramic body is $10 \times 10^{-7\circ}$ C.$^{-1}$, then the grain size required to achieve a dilatometric CTE of less than $40 \times 10^{-7\circ}$ C.$^{-1}$ must be at least 6.5 μm. Also plotted in FIG. 6 are other preferred lower limits for g corresponding to values of $k_2=1.25$, 1.50, 1.75, and 2.00.

As mentioned, a zirconium tin titanate ceramic having a dilatometric $CTE_{25-1000^\circ\ C.} \leq 40 \times 10^{-7\circ}$ C.$^{-1}$ has not been disclosed previously. In addition, no example of a zirconium tin titanate ceramic has been disclosed previously possessing a combination of composition and microstructure that would inherently possess a bulk CTE of $\leq 40 \times 10^{-7\circ}$ C.$^{-1}$ even if the CTE of the body was not reported. Previous studies have usually been directed to the formation of zirconium tin titanate ceramics for dielectric applications, where the CTE of the body is not important and where microcracking would have undesirable effects on the dielectric properties, particularly in the presence of moisture. Furthermore, such studies have tended to focus on compositions in which $TiO_2$ comprised more than 30 mol % of the ceramic, for which $CTE_{min} > 30 \times 10^{-7\circ}$ C.$^{-1}$ in the zirconium tin titanate phase and for which a dilatometric $CTE_{25-1000^\circ\ C.} \leq 40 \times 10^{-7\circ}$ C.$^{-1}$ could not have been achieved even with microcracking present.

Hirano et al. (Hirano, S., Hayashi, T., and Hattori, A. (1991) "Chemical Processing and Microwave Characteristics of (Zr,Sn)$TiO_4$ Microwave Dielectrics," *J. Am. Cer. Soc.* 74 [6] 1320-1324) prepared a solution of zirconium, tin, and titanium isopropoxides which was subsequently hydrolyzed to produce a precipitation of amorphous powder of $Zr_{0.8}Sn_{0.2}TiO_4$ composition by several processing routes. Median particle sizes were 0.4 μm or finer. Powders were pressed into discs that were fired at 1600° C. for 3 or 24 hours. The microstructure comprised densely packed grains with no evidence of microcracking. Grain size measured by the present investigation on Hirano's electron microscopy image for the sample that was held for 24 hours at 1600° C. using the three-circle intercept method yielded a grain size of 9.4 microns. The composition of Hirano's zirconium tin titanate phase would inherently have a mean lattice $CTE_{25-1000^\circ\ C.}$ of about $74 \times 10^{-7\circ}$ C.$^{-1}$ and a minimum axial CTE of about $58 \times 10^{-7\circ}$ C.$^{-1}$. In the absence of microcracks, Hirano's ceramic would have a dilatometric CTE of about $74 \times 10^{-7\circ}$ C.$^{-1}$.

Huang and Weng (Huang, C.-L. and Weng, M.-H. (2000) "Liquid phase sintering of (Zr,Sn)$TiO_4$ microwave dielectric ceramics," *Mat. Res. Bull.*, 35, 1881-1888) sintered $Zr_{0.8}Sn_{0.2}TiO_4$ ceramics at 1220 and 1300° C. with 0.5, 1.0, and 2.0 wt % copper oxide additions as sintering aids. Microstructures exhibited densely packed grains with no evidence of microcracking. The composition of Huang and Weng's zirconium tin titanate phase would inherently have a mean lattice $CTE_{25-1000^\circ\ C.}$ of about $74 \times 10^{-7\circ}$ C.$^{-1}$ and a minimum lattice axial CTE of about $58 \times 10^{-7\circ}$ C.$^{-1}$. In the absence of microcracks, the ceramic of Huang and Weng would have a dilatometric CTE of about $74 \times 10^{-7\circ}$ C.$^{-1}$.

Huang et al. (Huang, C.-L., Weng, M.-H., Chen, H.-L. (2001) "Effects of additives on microstructures and microwave dielectric properties of (Zr,Sn)$TiO_4$ ceramics," *Materials Chemistry and Physics* 71, 17-22) subsequently prepared sintered $Zr_{0.8}Sn_{0.2}TiO_4$ ceramics at 1300° C. with 1.0 wt % bismuth oxide or 1.0 wt % vanadium pentoxide additions as sintering aids. Microstructures again comprised densely packed grains with no evidence of microcracking. The composition of Huang's zirconium tin titanate phase would inherently have a mean lattice $CTE_{25-1000^\circ\ C.}$ of about $74 \times 10^{-7\circ}$ C.$^{-1}$ and a minimum lattice axial CTE of about $58 \times 10^{-7\circ}$ C.$^{-1}$. In the absence of microcracks, Huang's ceramic would have a dilatometric CTE of about $74 \times 10^{-7\circ}$ C.$^{-1}$.

Houivet et al. (Houivet, D., El Fallah, J., Lamagnere, B., Haussonne, J.-M. (2001) Effect of annealing on the microwave properties of (Zr,Sn)TiO$_4$ ceramics, *J. Eur. Cer. Soc.*, 21, 1727-1730) prepared a Zr$_{0.65}$Sn$_{0.33}$Ti$_{1.02}$O$_4$ ceramic from metal oxide powders of unspecified particle size, with additions of lanthanum and nickel oxides as sintering aids, and fired the compact thereof at 1370° C. for 20 hours. Houivet's micrograph of an as-fired surface shows a grain size of "30 to 50 µm" for the zirconium tin titanate phase and no evidence of microcracking. The composition of Houivet's zirconium tin titanate phase would inherently have a mean lattice CTE$_{25-1000°\ C.}$ of about $70 \times 10^{-7\circ}$ C.$^{-1}$ and a minimum lattice axial CTE of about $50 \times 10^{-7\circ}$ C.$^{-1}$. In the absence of microcracks, Houivet's ceramic would have a dilatometric CTE of about $70 \times 10^{-7\circ}$ C.$^{-1}$.

Iddles et al. (Iddles, D. M., Bell, A. J., Moulson, A. J. (1992) Relationships between dopants, microstructure and the microwave dielectric properties of ZrO$_2$—TiO$_2$—SnO$_2$ ceramics, *J. Mater. Sci*, 27, 6303-6310) prepared Zr$_{0.875}$Ti$_{0.875}$Sn$_{0.25}$O$_4$ ceramics from a mixture of the metal oxide powders of unspecified particle size by firing at 1325-1375° C. for up to 128 hours. Micrographs show no evidence of microcracking. The composition of Iddles' zirconium tin titanate phase would inherently have a mean lattice CTE$_{25-1000°\ C.}$ of about $70 \times 10^{-7\circ}$ C.$^{-1}$ and a minimum lattice axial CTE of about $50 \times 10^{-7\circ}$ C.$^{-1}$. In the absence of microcracks, Iddles' ceramic would have a dilatometric CTE of about $70 \times 10^{-7\circ}$ C.$^{-1}$.

Kim et al. (Kim, D.-J., Hahn, J.-W., Han, G.-P., Lee, S.-S., Choy, T.-G. (2000) Effects of Alkaline-Earth-Metal Addition on the Sinterability and Microwave Characteristics of (Zr, Sn)TiO$_4$ Dielectrics) prepared Zr$_{0.8}$Sn$_{0.2}$TiO$_4$ ceramics from pressed discs of mixtures of metal oxide powders of unspecified particle size with and without sintering aids and fired these at 1300-1625° C. Optical micrographs showed no evidence of microcracking. The composition of Kim's zirconium tin titanate phase would inherently have a mean lattice CTE$_{25-1000°\ C.}$ of about $74 \times 10^{-7\circ}$ C.$^{-1}$ and a minimum lattice axial CTE of about $58 \times 10^{-7\circ}$ C.$^{-1}$. In the absence of microcracks, Kim's ceramic would have a dilatometric CTE of about $74 \times 10^{-7\circ}$ C.$^{-1}$.

In sum, a Zr—Sn-titanate ceramic that could have exhibited a CTE$_{25-1000°\ C.}$≤$40 \times 10^{-7\circ}$ C.$^{-1}$ was not previously known or suggested in the art.

Exemplary embodiments of the present disclosure also provide a method of manufacturing zirconium tin titanate ceramic articles from a ceramic forming precursor batch composition comprised of certain inorganic powdered raw materials. Generally, the method first comprises providing an inorganic batch composition comprising a zirconium containing source, a titanium containing source, and a tin containing source. The inorganic batch composition is then mixed together with one or more processing aid(s) selected from the group consisting of a plasticizer, lubricant, binder, pore former, and solvent, to form a plasticized ceramic precursor batch composition. The inorganic powdered raw materials of the inorganic batch composition may be mixed or may be not mixed prior to mixing together with the one or more processing aid(s). The plasticized ceramic precursor batch composition can be shaped or otherwise formed into a green body, optionally dried, and subsequently fired under conditions effective to convert the green body into a ceramic article.

The zirconium containing source can, for example and without limitation, be provided as ZrO$_2$ powder The titanium containing source can be provided as TiO$_2$ powder.

The tin containing source can be provided as SnO$_2$ powder.

Minor amounts of other constituents can be added to the precursor batch composition or be included in the zirconium containing source, titanium containing source, and the tin containing source. For example, Hf, Al, Si, Ga, Fe, Cr, Mn, Ta, Nb, In, Sb, La, Ce, Y, Sr, Ca, Mg, Zn, W, Sc, and Ge can be added to the precursor batch composition. For example, these other constituents may be present or can be added to the precursor batch composition to lower the firing temperature and broaden the firing window required to form the ceramic composition. The amount of these other constituents can, for example, be from 0 to 10 weight percent of the total composition. For example, these other constituents may be present or can be added in an amount of between about 0.1 and 3.0 wt %, for example, between about 0.25 and 2.0 wt %.

Still further, the ceramic precursor batch composition may comprise other additives such as surfactants, oil lubricants and pore-forming material. Non-limiting examples of surfactants that may be used as forming aids are $C_8$ to $C_{22}$ fatty acids, and/or their derivatives. Additional surfactant components that may be used with these fatty acids are $C_8$ to $C_{22}$ fatty esters, $C_8$ to $C_{22}$ fatty alcohols, and combinations of these. Exemplary surfactants are stearic, lauric, myristic, oleic, linoleic, palmitic acids, and their derivatives, tall oil, stearic acid in combination with ammonium lauryl sulfate, and combinations of all of these. In an illustrative embodiment, the surfactant is lauric acid, stearic acid, oleic acid, tall oil, and combinations of these. In some of these embodiments, the amount of surfactants is from about 0.25% by weight to about 2% by weight.

Non-limiting examples of oil lubricants used as forming aids include light mineral oil, corn oil, high molecular weight polybutenes, polyol esters, a blend of light mineral oil and wax emulsion, a blend of paraffin wax in corn oil, and combinations of these. In some embodiments, the amount of oil lubricants is from about 1% by weight to about 10% by weight. In an exemplary embodiment, the oil lubricants are present from about 3% by weight to about 6% by weight.

The precursor composition can, if desired, contain a pore-forming agent to tailor the porosity and pore size distribution in the fired body for a particular application. A pore former is a fugitive material which evaporates or undergoes vaporization by combustion during drying or heating of the green body to obtain a desired, usually higher porosity and/or coarser median pore diameter. A suitable pore former can include, without limitation, carbon; graphite; starch; wood, shell, or nut flour; polymers such as polyethylene beads; waxes; and the like. When used, a particulate pore former can have a median particle diameter in the range of from 10 µm to 70 µm, and more preferably from 15 µm to 50 µm.

The inorganic ceramic forming batch components, along with any optional sintering aid and/or pore former, can be intimately blended with a liquid vehicle and forming aids which impart plastic formability and green strength to the raw materials when they are shaped into a body. When forming is done by extrusion, a cellulose ether binder such as methylcellulose, hydroxypropyl methylcellulose, methylcellulose derivatives, and/or any combinations thereof, can serve as a temporary organic binder, and sodium stearate can serve as a lubricant. The relative amounts of forming aids can vary depending on factors such as the nature and amounts of raw materials used, etc. For example, the typical amounts of forming aids are about 2% to about 10% by weight of methyl cellulose, and preferably about 3% to about 6% by weight, and about 0.5% to about 1% by weight sodium stearate, stearic acid, oleic acid or tall oil, and preferably about 0.6% by weight. The raw materials and the forming aids are typically mixed together in dry form and then mixed with water as the vehicle. The amount of water can vary from one batch of materials to another and therefore is determined by pre-testing the particular batch for extrudability.

The liquid vehicle component can vary depending on the type of material used in order to impart optimum handling properties and compatibility with the other components in the ceramic batch mixture. The liquid vehicle content can be in the range of from 15% to 50% by weight of the plasticized composition. In one embodiment, the liquid vehicle component can comprise water. In another embodiment, depending on the component parts of the ceramic batch composition, it should be understood that organic solvents such as, for example, methanol, ethanol, or a mixture thereof can be used as the liquid vehicle.

Forming or shaping of the green body from the plasticized precursor composition may be done by, for example, typical ceramic fabrication techniques, such as uniaxial or isostatic pressing, extrusion, slip casting, and injection molding. Extrusion is preferred when the ceramic article is of a honeycomb geometry, such as for a catalytic converter flow-through substrate or a diesel particulate wall-flow filter. The resulting green bodies can be optionally dried, and then fired in a gas or electric kiln or by microwave heating, under conditions effective to convert the green body into a ceramic article. For example, the firing conditions effective to convert the green body into a ceramic article can comprise heating the green body at a maximum soak temperature in the range of from 1350° C. to 1750° C., for example, in the range of from 1400° C. to 1700° C., or in the range of from 1450° C. to 1650° C., and maintaining the maximum soak temperature for a hold time sufficient to convert the green body into a ceramic article, followed by cooling at a rate sufficient not to thermally shock the sintered article. For example, compositions in which the composition of the zirconium tin titanate phase satisfies the relation $15 \leq S \leq 32$ and $5 \leq T \leq 22$ may be fired at the lower end of the firing range.

To obtain a wall-flow filter, a portion of the cells of the honeycomb structure at the inlet end or face are plugged. The plugging is only at the ends of the cells which can be to a depth of about 1 to 20 mm, although this can vary. A portion of the cells on the outlet end but not corresponding to those on the inlet end are plugged. Therefore, each cell is plugged only at one end. An exemplary arrangement is to have every other cell on a given face plugged in a checkered pattern. Alternatively, when a portion of the cells are not plugged at both the inlet end and the outlet end, a partial filter is obtained. Further, a portion of the cells can be plugged at both the inlet and outlet ends to provide thermal and/or filtration variability to the substrate, filter, or partial filter.

EXAMPLES

Exemplary embodiments of the disclosure are further described below with respect to certain exemplary and specific embodiments thereof, which are illustrative only and not intended to be limiting. Exemplary and comparative experimental examples were prepared to further illustrate and to provide a further understanding of the disclosure and are incorporated in and constitute a part of this specification, and together with the description serve to further explain the principles of the disclosure.

In accordance with some of the embodiments, eleven ceramic compositions in the $ZrO_2$—$TiO_2$—$SnO_2$ system as provided in Table 1 were prepared from mixtures of the component metal oxide powders. Raw materials comprised zirconium oxide (median particle diameter=6 μm), titanium oxide (median particle diameter=0.4 μm), and tin oxide (median particle diameter=6 μm). Particle sizes were measured by laser diffraction using a Microtrac S3500 particle size analyzer. Batches comprising 1500 grams of the oxides were weighed out and mixed with 135 grams of methyl cellulose as a binder in a Processall® Mixer. The batch was transferred to a stainless steel muller and plasticized with either 225 ml of deionized water (compositions D to I) or 150 ml deionized water and 15 grams of tall oil (compositions L to Q). The material was transferred to a ram extruder, vacuum was pulled on the mixture, and the material was passed through a "spaghetti die" several times before being extruded as 8 mm diameter rod. The rod was cut into 24-inch sections that were placed in glass tubes and dried in a convection oven for several days. Dried rods were cut into segments that were set in an alumina tray and fired in an electric furnace at 50° C./h to 1400, 1500, or 1600° C., held for 10 hours, and cooled at a nominal rate of 500° C./h. Cooling rate was slower at lower temperatures due to the thermal mass of the furnace. Portions of the rods were crushed and submitted for x-ray diffractometry with Rietveld refinement of the data. Other rods were used for measurement of CTE by dilatometry. Porosities of compositions sintered at 1400° C. were determined from their theoretical densities and the Archimedes method. Additional samples of four of the eleven compositions were fired at 1600° C. for measurement of mercury porosimetry, four-point modulus of rupture, and Young's elastic modulus to 1200° C. (sonic resonance technique).

TABLE 1

Batch compositions of examples

| Composition Code | D | E | F | G | H | L | M | N | O | P | Q |
| --- | --- | --- | --- | --- | --- | --- | --- | --- | --- | --- | --- |
| Wt % $ZrO_2$ | 60.67 | 54.93 | 50.17 | 44.02 | 40.59 | 48.77 | 47.44 | 46.18 | 65.45 | 61.59 | 58.15 |
| Wt % $TiO_2$ | 39.33 | 24.92 | 13.01 | 38.04 | 26.31 | 9.48 | 6.15 | 2.99 | 21.21 | 13.31 | 6.28 |
| Wt % $SnO_2$ | 0.00 | 20.15 | 36.82 | 17.94 | 33.10 | 41.75 | 46.41 | 50.83 | 13.34 | 25.11 | 35.56 |
| Mole % $ZrO_2$ | 50.0 | 50.0 | 50.0 | 37.5 | 37.5 | 50.0 | 50.0 | 50.0 | 60.0 | 60.0 | 60.0 |
| Mole % $TiO_2$ | 50.0 | 35.0 | 20.0 | 50.0 | 37.5 | 15.0 | 10.0 | 5.0 | 30.0 | 20.0 | 10.0 |

TABLE 1-continued

Batch compositions of examples

| Composition Code | | D | E | F | G | H | L | M | N | O | P | Q |
|---|---|---|---|---|---|---|---|---|---|---|---|---|
| Mole % $SnO_2$ | | 0.0 | 15.0 | 30.0 | 12.5 | 25.0 | 35.0 | 40.0 | 45.0 | 10.0 | 20.0 | 30.0 |
| Nominal Stoichiometry of Zirconium Tin Titanate Phase | Zr per 4 oxygens | 1.00 | 1.00 | 1.00 | 0.75 | 0.75 | 1.00 | 1.00 | 1.00 | 1.20 | 1.20 | 1.20 |
| | Ti per 4 oxygens | 1.00 | 0.70 | 0.40 | 1.00 | 0.75 | 0.30 | 0.20 | 0.10 | 0.60 | 0.40 | 0.20 |
| | Sn per 4 oxygens | 0.00 | 0.30 | 0.60 | 0.25 | 0.50 | 0.70 | 0.80 | 0.90 | 0.20 | 0.40 | 0.60 |

The unit cell parameters of the zirconium tin titanate phases sintered at 1600° C. (Table 5), as derived by Rietveld refinement of the XRD patterns, were fit as a function of the nominal compositions of the zirconium tin titanate phases. The variables available to the model for each unit cell parameter were $N_{Zr}$, $N_{Sn}$, $N_{Ti}$, and the squares of these variables, where $N_i$ is the number of atoms of element "i" in a 4-oxygen formula unit. Only those variables with a statistically significant correlation were included in each model. Data for all ten samples were used for fitting each parameter with the exception of the a parameter, in which the P6 and Q6 examples were identified as being statistical outliers. The corresponding equations are as follows, for which the $R^2$ values were at least 99.5%:

$$a\text{-dimension (Å)} = 4.54656 + 0.260861(N_{Zr}) + 0.0657063(N_{Sn}) \quad \text{(Eq 6)}$$

$$b\text{-dimension (Å)} = 5.07079 + 0.707332(N_{Sn}) - 0.321695(N_{Sn})^2 + 0.21806(N_{Zr}) + 0.13948(N_{Ti})^2 \quad \text{(Eq 7)}$$

$$c\text{-dimension (Å)} = 5.25636 - 0.182123(N_{Ti}) - 0.0489722(N_{Zr}) \quad \text{(Eq 8)}$$

Equations (6), (7), and (8) were used to back-calculate the compositions of the zirconium tin titanate phases at 1400° C., 1500° C., and 1600° C. for those examples for which the unit cell parameters were determined. All zirconium tin titanate phases were found to be within about ±2 atomic percent of their nominal compositions with the exception of the N, P and Q compositions. The zirconium tin titanate phase in the N composition was found to be enriched in zirconium and depleted in tin relative to the nominal batched composition, and the sample also contained substantial tin oxide solid solution and minor zirconium oxide solid solution as second phases (Table 3). This implies that the bulk composition of N lies somewhat outside the stability limit of the zirconium tin titanate field at 1500° C., lying within the zirconium tin titanate+tin oxide solid solution+zirconium oxide solid solution three-phase region, close to the zirconium tin titanate+tin oxide solid solution two-phase tie line. The zirconium tin titanate phases in the P and Q compositions were found to be depleted in zirconium and enriched in tin (and to a lesser extent enriched in titanium) as shown in Tables 3, 4, and 5. This suggests that the bulk P and Q compositions lie slightly outside the stability limits of the zirconium tin titanate phase field, and within the zirconium tin titanate+zirconium oxide solid solution two-phase region.

Also determined were the lattice axial CTE values for the ten compositions fired at 1600° C. using high-temperature x-ray diffractometry, in which the unit cell parameters were measured at 100° C. intervals to 1000° C. Values of CTE(a), CTE(b), CTE(c), mean lattice CTE, and maximum CTE anisotropy are reported in Table 6.

Only the first five compositions, D to H, were sintered at 1400° C., and all examples are comparative (Table 2). Compositions of examples D4, E4, G4, and H4 lie outside the composition range of the exemplary embodiments of the present disclosure and cannot achieve a dilatometric $CTE_{25\text{-}1000°\,C.} \leq 40 \times 10^{-7°}\,C.^{-1}$ because their minimum lattice axial CTE is $>30 \times 10^{-7°}\,C.^{-1}$ and therefore no physically realistic level of microcracking would be capable of reducing the $CTE_{25\text{-}1000°\,C.}$ of a ceramic body of those compositions to the range of less than $40 \times 10^{-7°}\,C.^{-1}$. The composition of example F4 does lie within the compositional range of the exemplary embodiments, and the minimum axial CTE value of the zirconium tin titanate phase is less than $30 \times 10^{-7°}\,C.^{-1}$ and therefore lies within the range of the exemplary embodiments for these parameters; however, the microcrack index $(Nb^3)_{IA}$ value of 0.010 and the grain size of 2.8 μm lie outside the ranges of the exemplary embodiments of the present disclosure (FIGS. 5 and 6). The small grain size of the F composition sintered at 1400° C. is insufficient to promote the amount of microcracking required to reduce the CTE of the ceramic to $\leq 40 \times 10^{-7°}\,C.^{-1}$. It is also evident that the addition of tin reduces the grain size of the ceramic body from 8.2 μm for example D4 to 2.8 μm for example F4.

TABLE 2

Properties of comparative examples fired at 1400° C.

| | Example Code | | | | |
|---|---|---|---|---|---|
| | D4 | E4 | F4 | G4 | H4 |
| | Example Type | | | | |
| Composition Code | Comp D | Comp E | Comp F | Comp G | Comp H |
| Nominal Composition | | | | | |
| Zr per 4 ox | 1.00 | 1.00 | 1.00 | 0.75 | 0.75 |
| Ti per 4 ox | 1.00 | 0.70 | 0.40 | 1.00 | 0.75 |
| Sn per 4 ox | 0.00 | 0.30 | 0.60 | 0.25 | 0.50 |

TABLE 2-continued

Properties of comparative examples fired at 1400° C.

| | Example Code | | | | |
|---|---|---|---|---|---|
| | D4 | E4 | F4 | G4 | H4 |
| | | | Example Type | | |
| Composition Code | Comp D | Comp E | Comp F | Comp G | Comp H |
| Composition Derived from Lattice Parameters | | | | | |
| Zr per 4 ox | 1.01 | 1.00 | 0.99 | 0.74 | 0.76 |
| Ti per 4 ox | 0.98 | 0.69 | 0.40 | 1.01 | 0.77 |
| Sn per 4 ox | 0.01 | 0.31 | 0.61 | 0.25 | 0.47 |
| Weight Percentages by XRD | | | | | |
| Zirconium Titanate | 100 | 0 | 0 | 0 | 0 |
| Zirconium Tin Titanate | 0 | 100 | 99.7 | 100 | 99.8 |
| Tin Oxide | 0 | 0 | 0.3 | 0 | 0.2 |
| Lattice Parameter a (Å) | 4.8085 | 4.8288 | 4.8447 | 4.7548 | 4.7768 |
| Lattice Parameter b (Å) | 5.4311 | 5.5431 | 5.6195 | 5.5300 | 5.5812 |
| Lattice Parameter c (Å) | 5.0297 | 5.0794 | 5.1347 | 5.0375 | 5.0784 |
| Theoretical Density (g cm$^{-3}$) | 5.135 | 5.480 | 5.835 | 5.264 | 5.585 |
| Skeletal Density (g cm$^{-3}$) | 4.905 | 4.979 | 5.626 | 4.840 | 5.169 |
| Bulk Density (g cm$^{-3}$) | 4.785 | 4.896 | 4.614 | 4.789 | 4.792 |
| % Total Porosity | 6.9 | 10.8 | 21.6 | 9.1 | 14.7 |
| CTE$_{25-800}$ by dilatometry ($10^{-7}$ C.$^{-1}$) | 79.5 | 58.4 | 47.1 | 67.6 | 59.2 |
| CTE$_{25-1000}$ by dilatometry ($10^{-7}$ C.$^{-1}$) | 81.7 | 60.8 | 49.5 | 70.4 | 61.4 |
| Mean Lattice CTE$_{25-1000}$ ($10^{-7}$ C.$^{-1}$) | 86.6 | 62.4 | 49.3 | 73.5 | 57.1 |
| Minimum Lattice CTE$_{25-1000}$ ($10^{-7}$ C.$^{-1}$) | 69.3 | 37.9 | 2.4 | 58.3 | 35.9 |
| Maximum CTE Anisotropy ($10^{-7}$ C.$^{-1}$) | 34.0 | 47.6 | 99.0 | 27.0 | 52.3 |
| Mean Linear Intercept Grain Size (μm) | 8.4 | — | 2.8 | — | — |
| Microcrack Index, Nb$^3$ (Image Analysis) | 0.059 | — | 0.010 | — | — |

Figure 7:
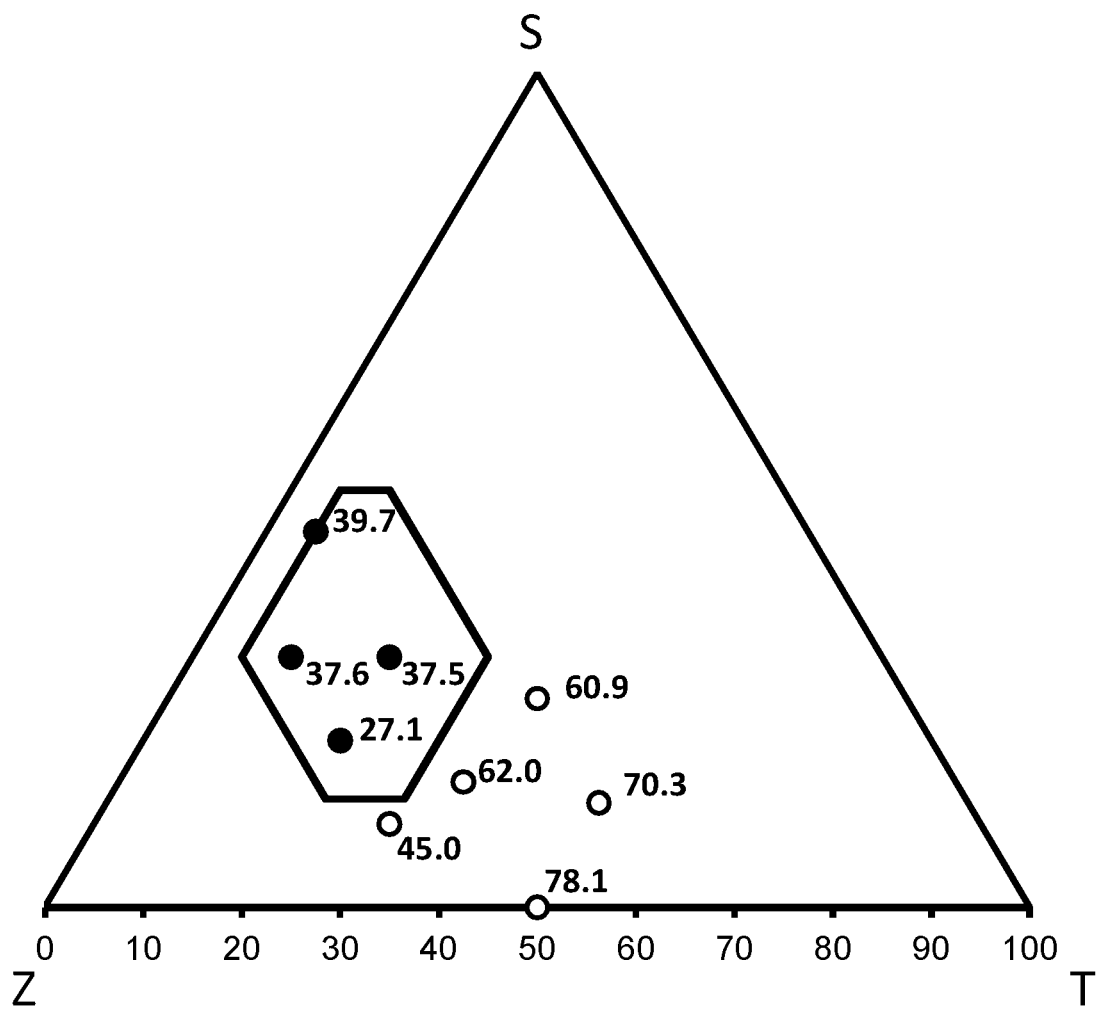
FIG. 7 displays the compositions of the zirconium tin titanate phase in exemplary embodiments of the disclosure (solid circles) and comparative (open circles) examples fired at 1500° C. (Table 3) in terms of the mole percentages of the $ZrO_2$, $TiO_2$, and $SnO_2$ components in the zirconium tin titanate phase normalized to 100%. Numbers indicate dilatometric CTE from 25 to 1000° C. Polygon denotes preferred exemplary compositional limits from FIG. 2.

All eleven compositions were fired at 1500° C. (Table 3). Among these, exemplary examples F5, N5, P5, and Q5 exhibit a dilatometric CTE$_{25-1000°\ C.}$≤40×10$^{7°}$ C.$^{-1}$. All four possess compositions within the preferred range of the exemplary embodiments of the present disclosure (FIG. 7), and all comprise a zirconium tin titanate phase having a minimum lattice axial CTE$_{min}$ 30×10$^{-7°}$ C.$^{-1}$. Comparative examples D5, E5, G5, H5, and O5 do not achieve a CTE$_{25-1000°\ C.}$≤40×10$^{-7°}$ C.$^{-1}$. These comparative examples have compositions that lie outside the preferred range of the exemplary embodiments of the present disclosure (FIG. 7) and their minimum axial CTEs are greater than 30×10$^{-7°}$ C.$^{-1}$. Comparative examples L5 and M5 lie within the preferred composition range and comprise a zirconium tin titanate phase having a minimum lattice axial CTE$_{min}$ 30×10$^{-7°}$ C.$^{-1}$, but do not achieve a dilatometric CTE$_{25-1000°\ C.}$≤40×10$^{-7°}$ C.$^{-1}$. Without wishing to be bound by theory, it is believed that comparative examples L5 and M5 do not achieve a dilatometric CTE$_{25-1000°\ C.}$≤40×10$^{-7°}$ C.$^{-1}$ because the grain size of examples L5 and M5 lie below the limit required to induce sufficient microcracking to reduce the dilatometric CTE to 40×10$^{-7°}$ C.$^{-1}$.

TABLE 3

Properties of comparative and exemplary examples fired at 1500° C.

| | Example Code | | | | | | | | | | |
|---|---|---|---|---|---|---|---|---|---|---|---|
| | D5 | E5 | F5 | G5 | H5 | L5 | M5 | N5 | O5 | P5 | Q5 |
| | | | | | | Example Type | | | | | |
| Composition Code | Comp D | Comp E | Exem F | Comp G | Comp H | Comp L | Comp M | Exem N | Comp O | Exem P | Exem Q |
| Nominal Composition | | | | | | | | | | | |
| Zr per 4 ox | 1.00 | 1.00 | 1.00 | 0.75 | 0.75 | 1.00 | 1.00 | 1.00 | 1.20 | 1.20 | 1.20 |
| Ti per 4 ox | 1.00 | 0.70 | 0.40 | 1.00 | 0.75 | 0.30 | 0.20 | 0.10 | 0.60 | 0.40 | 0.20 |
| Sn per 4 ox | 0.00 | 0.30 | 0.60 | 0.25 | 0.50 | 0.70 | 0.80 | 0.90 | 0.20 | 0.40 | 0.60 |
| Composition Derived from Lattice Parameters | | | | | | | | | | | |
| Zr per 4 ox | 1.01 | 1.01 | 0.99 | 0.74 | 0.77 | 1.00 | 1.04 | 1.11 | 1.19 | 1.16 | 1.13 |
| Ti per 4 ox | 0.98 | 0.68 | 0.40 | 0.99 | 0.75 | 0.28 | 0.19 | 0.11 | 0.62 | 0.41 | 0.22 |
| Sn per 4 ox | 0.01 | 0.32 | 0.61 | 0.26 | 0.49 | 0.72 | 0.77 | 0.78 | 0.19 | 0.43 | 0.65 |
| Weight Percentages by XRD | | | | | | | | | | | |
| Zirconium Titanate | 100 | 0 | 0 | 0 | 0 | 0 | 0 | 0 | 0 | 0 | 0 |
| Zirconium Tin Titanate | 0 | 99.0 | 95.5 | 100 | 100 | 98.7 | 91.8 | 77.6 | 93.0 | 96.1 | 92.6 |

TABLE 3-continued

Properties of comparative and exemplary examples fired at 1500° C.

| | Example Code | | | | | | | | | |
|---|---|---|---|---|---|---|---|---|---|---|
| | D5 | E5 | F5 | G5 | H5 | L5 | M5 | N5 | O5 | P5 | Q5 |
| | Example Type | | | | | | | | | |
| Composition Code | Comp D | Comp E | Exem F | Comp G | Comp H | Comp L | Comp M | Exem N | Comp O | Exem P | Exem Q |
| Tin Oxide | 0 | 0 | 0 | 0 | 0 | 0 | 7.3 | 19.2 | 0 | 0 | 0 |
| Monoclinic Zirconium Oxide | 0 | 1.0 | 4.5 | 0 | 0 | 1.3 | 0.9 | 3.3 | 6.9 | 3.8 | 7.4 |
| Lattice Parameter a (Å) | 4.8091 | 4.8306 | 4.8439 | 4.7573 | 4.7792 | 4.8539 | 4.8681 | 4.8896 | 4.8699 | 4.8768 | 4.8833 |
| Lattice Parameter b (Å) | 5.4305 | 5.5463 | 5.6211 | 5.5331 | 5.5848 | 5.6428 | 5.6557 | 5.6642 | 5.5080 | 5.5923 | 5.6438 |
| Lattice Parameter c (Å) | 5.0297 | 5.0817 | 5.1347 | 5.0400 | 5.0813 | 5.1555 | 5.1715 | 5.1872 | 5.0808 | 5.1271 | 5.1664 |
| $CTE_{25-800}$ by dilatometry ($10^{-7}$ °$C.^{-1}$) | 75.7 | 59.8 | 34.1 | 67.4 | 58.5 | 43.2 | 40.8 | 39.0 | 37.7 | 24.3 | 37.7 |
| $CTE_{25-1000}$ by dilatometry ($10^{-7}$ °$C.^{-1}$) | 78.1 | 62.0 | 37.5 | 70.3 | 60.9 | 45.4 | 43.1 | 39.7 | 45.0 | 27.1 | 37.6 |
| Mean Lattice $CTE_{25-1000}$ ($10^{-7}$ °$C.^{-1}$) | 86.6 | 62.4 | 49.3 | 73.5 | 57.1 | 47.0 | 45.1 | — | 61.2 | 43.4 | 40.1 |
| Minimum Lattice $CTE_{25-1000}$ ($10^{-7}$ °$C.^{-1}$) | 69.3 | 37.9 | 2.4 | 58.3 | 35.9 | −1.5 | −7.0 | — | 38.3 | −23.4 | −26.5 |
| Maximum CTE Anisotropy ($10^{-7}$ °$C.^{-1}$) | 34.0 | 47.6 | 99.0 | 27.0 | 52.3 | 105.6 | 115.2 | — | 43.6 | 136.8 | 143.6 |

Figure 8:
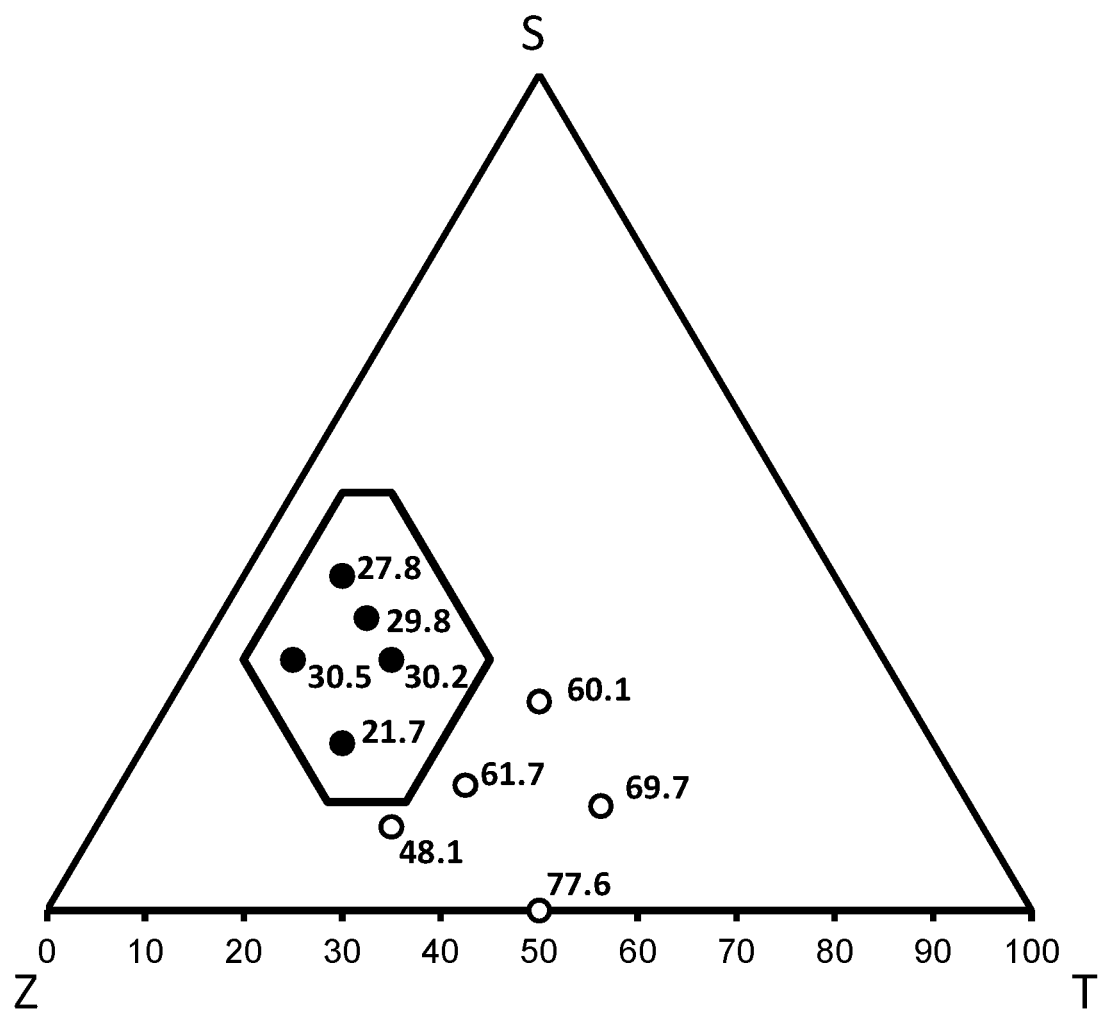
FIG. 8 displays the compositions of the zirconium tin titanate phase in exemplary embodiments of the disclosure (solid circles) and comparative (open circles) examples fired at 1600° C. (Table 4) in terms of the mole percentages of the $ZrO_2$, $TiO_2$, and $SnO_2$ components in the zirconium tin titanate phase normalized to 100%. Numbers indicate dilatometric CTE from 25 to 1000° C. Polygon denotes preferred exemplary compositional limits from FIG. 2.

Of the ten compositions fired at 1600° C. (Tables 4 and 5), the exemplary embodiments of the present disclosure examples F6, F6a, L6, M6, M6a, P6, P6a, and Q6 exhibit a dilatometric $CTE_{25-1000°\,C.} \leq 40 \times 10^{-7}$ $C.^{-1}$. All have compositions that lie within the preferred range of the exemplary embodiments of the present disclosure (FIG. 8) and all have a minimum lattice axial $CTE_{min}$ $30 \times 10^{-7}$ $C.^{-1}$. Furthermore, the F6a, M6a, and P6a examples all possess grain sizes and microcrack indices, $(Nb^3)_{I4}$, that lie within the preferred range of the exemplary embodiments of the present disclosure (FIGS. 5 and 6). Without wishing to be bound by theory, it is believed that the increase in sintering temperature from 1500 to 1600° C. produced a sufficient increase in the grain size of the examples from the L and M compositions to provide adequate microcracking and reduce the dilatometric CTE to $40 \times 10^{-7}$ $C.^{-1}$. Comparative examples D6, D6a, E6, G6, H6, and O6 do not achieve a $CTE_{25-1000°\,C.} \leq 40 \times 10^{-7}$ $C.^{-1}$. The compositions of these comparative examples lie outside the preferred range of the exemplary embodiments of the present disclosure (FIG. 7) and their minimum axial CTEs are greater than $30 \times 10^{-7}$ $C.^{-1}$. The examples in Table 5 illustrate the tendency for grain size to decrease with increasing tin content for a given sintering temperature.

Figure 9:
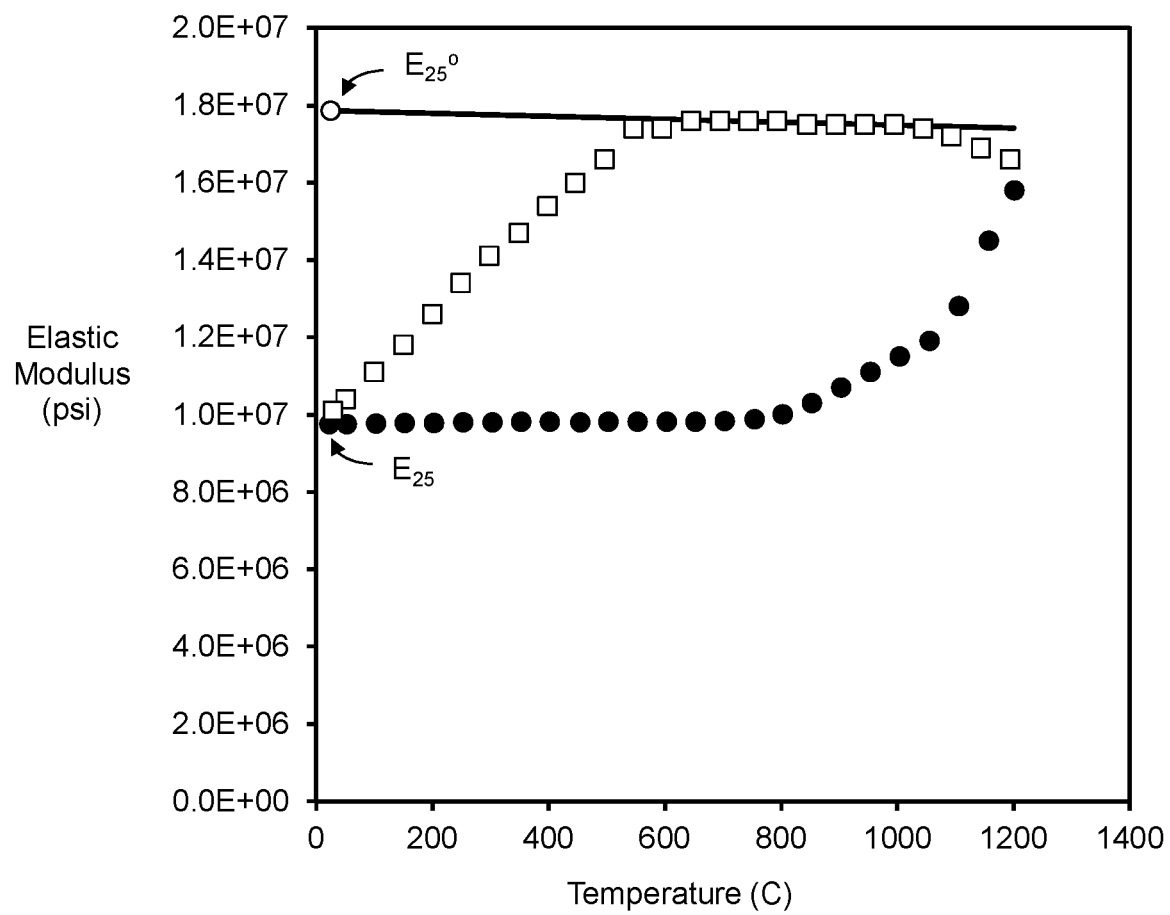
FIG. 9 is a plot of the Young's elastic modulus versus temperature during heating (filled circles) and cooling (open squares) of comparative Example D6a. $E_{25}°$ is denoted by the open circle and is the value of the tangent line to the linear section of the cooling curve from 650 to 1000° C. extrapolated to room temperature.
Figure 10:
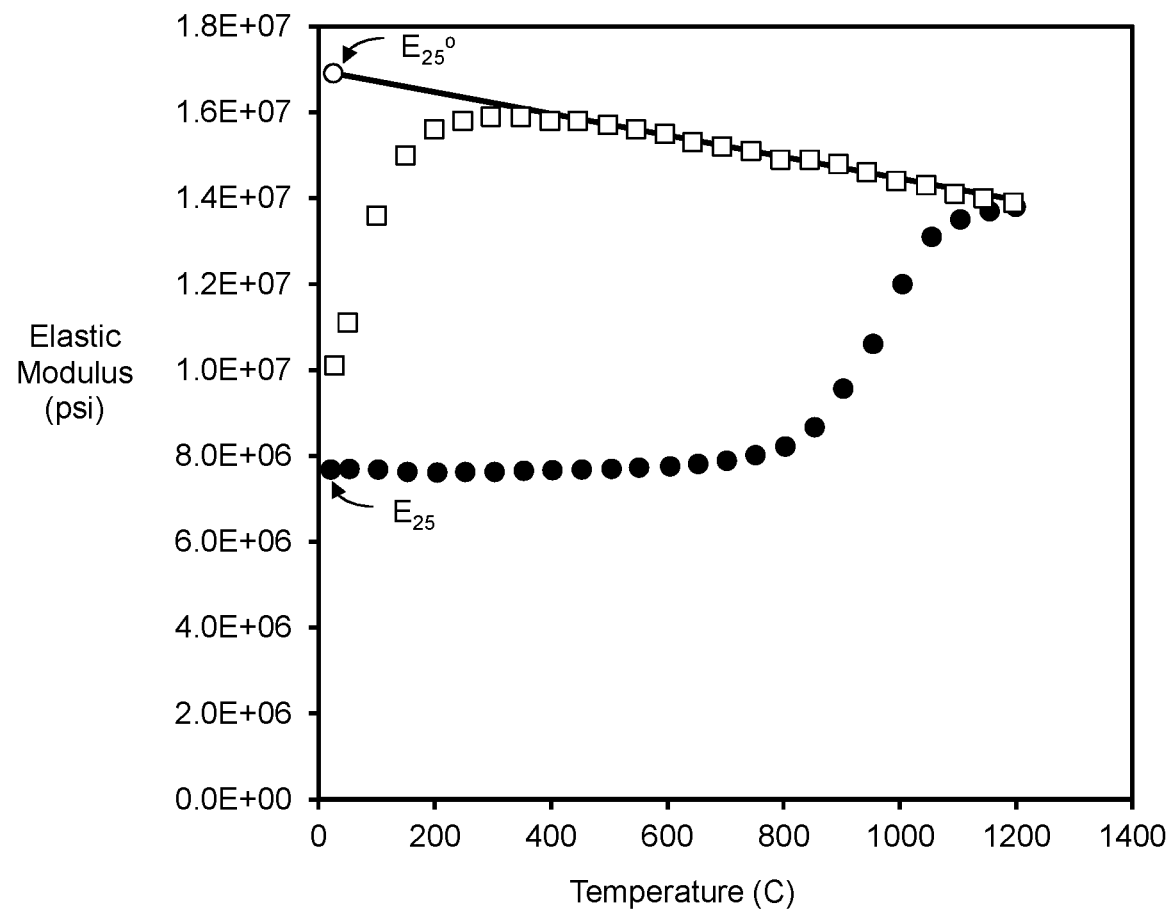
FIG. 10 is a plot of the Young's elastic modulus versus temperature during heating (filled circles) and cooling (open squares) of exemplary Example M6a. $E_{25}°$ is denoted by the open circle and is the value of the tangent line to the linear section of the cooling curve from 500 to 1200° C. extrapolated to room temperature.
Figure 11:
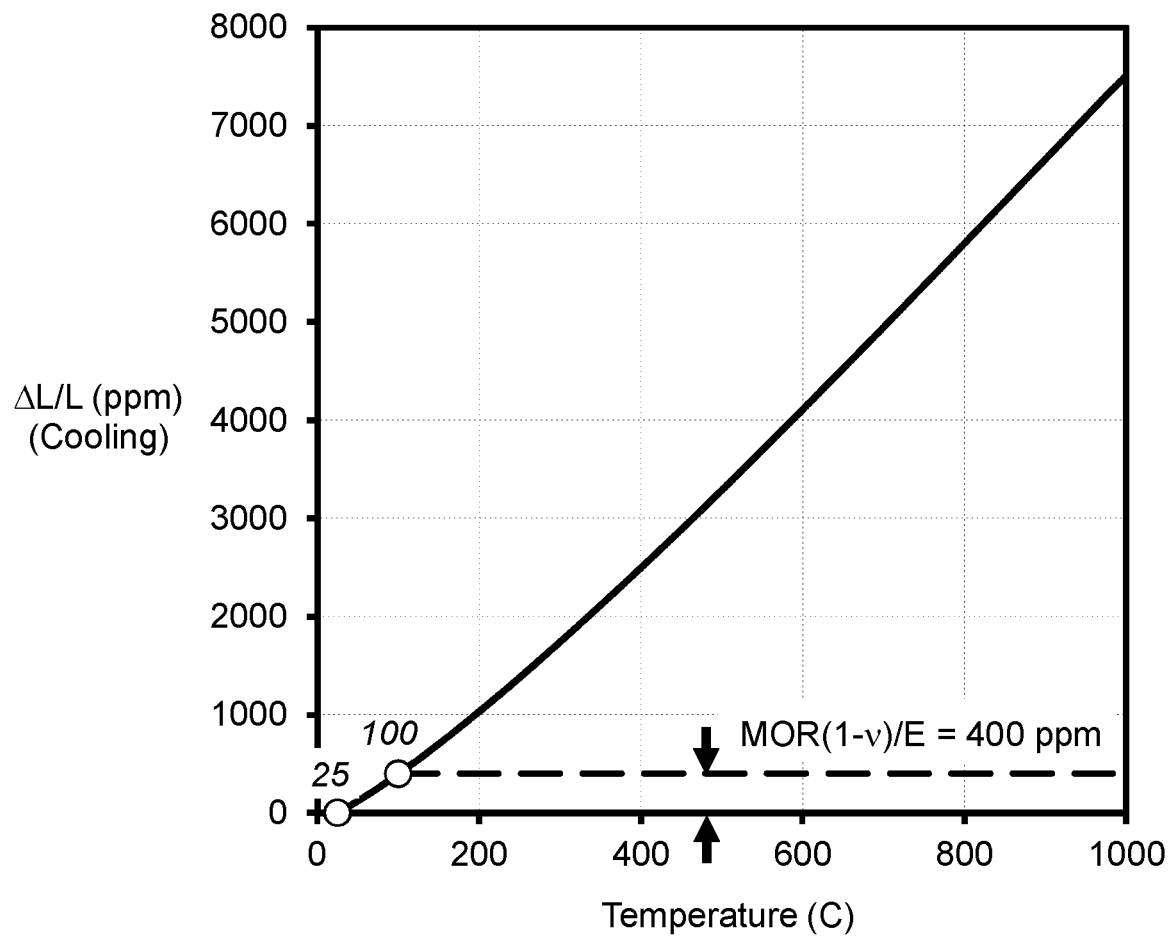
FIG. 11 is a plot of $\Delta L/L$ versus temperature on heating and the predicted thermal shock limit for comparative Example D6a of about 100° C.
Figure 12:
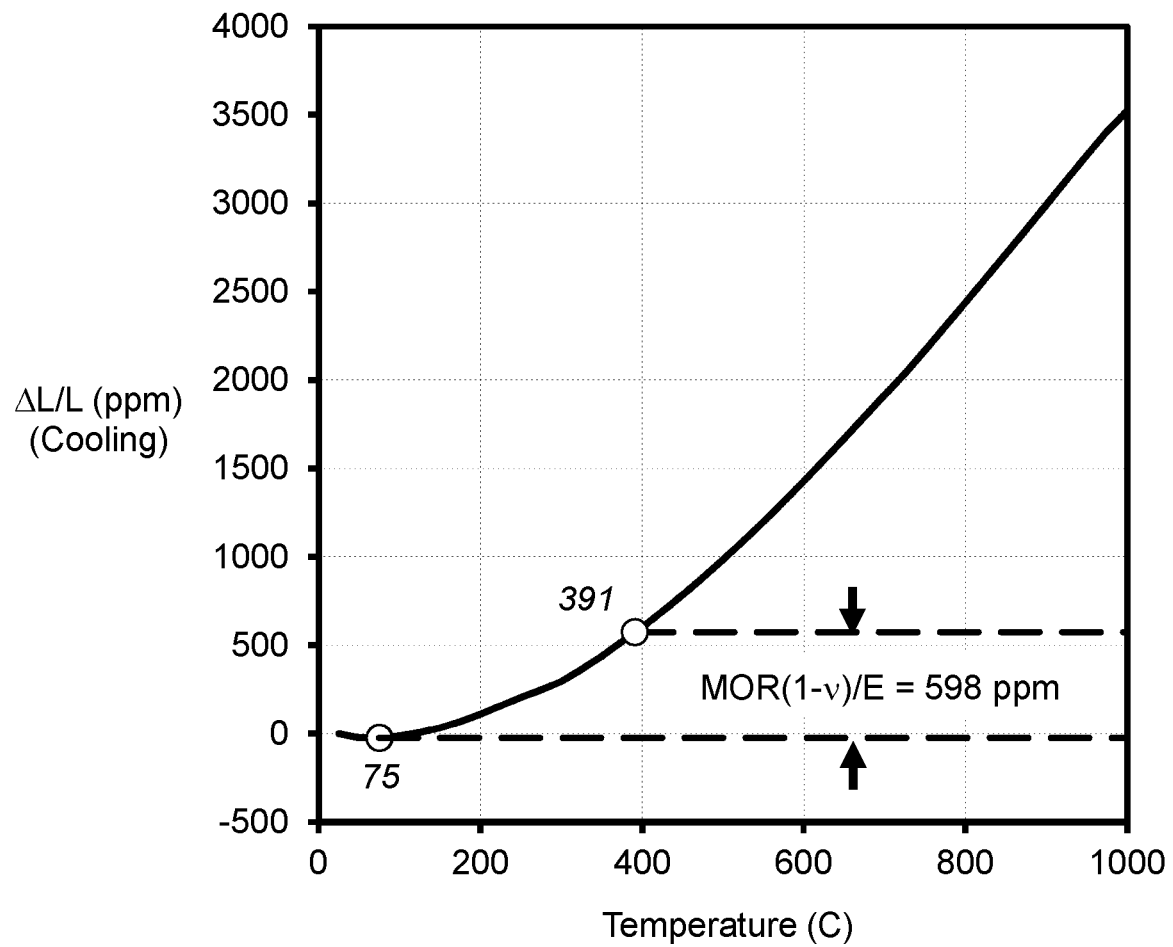
Figure 13:
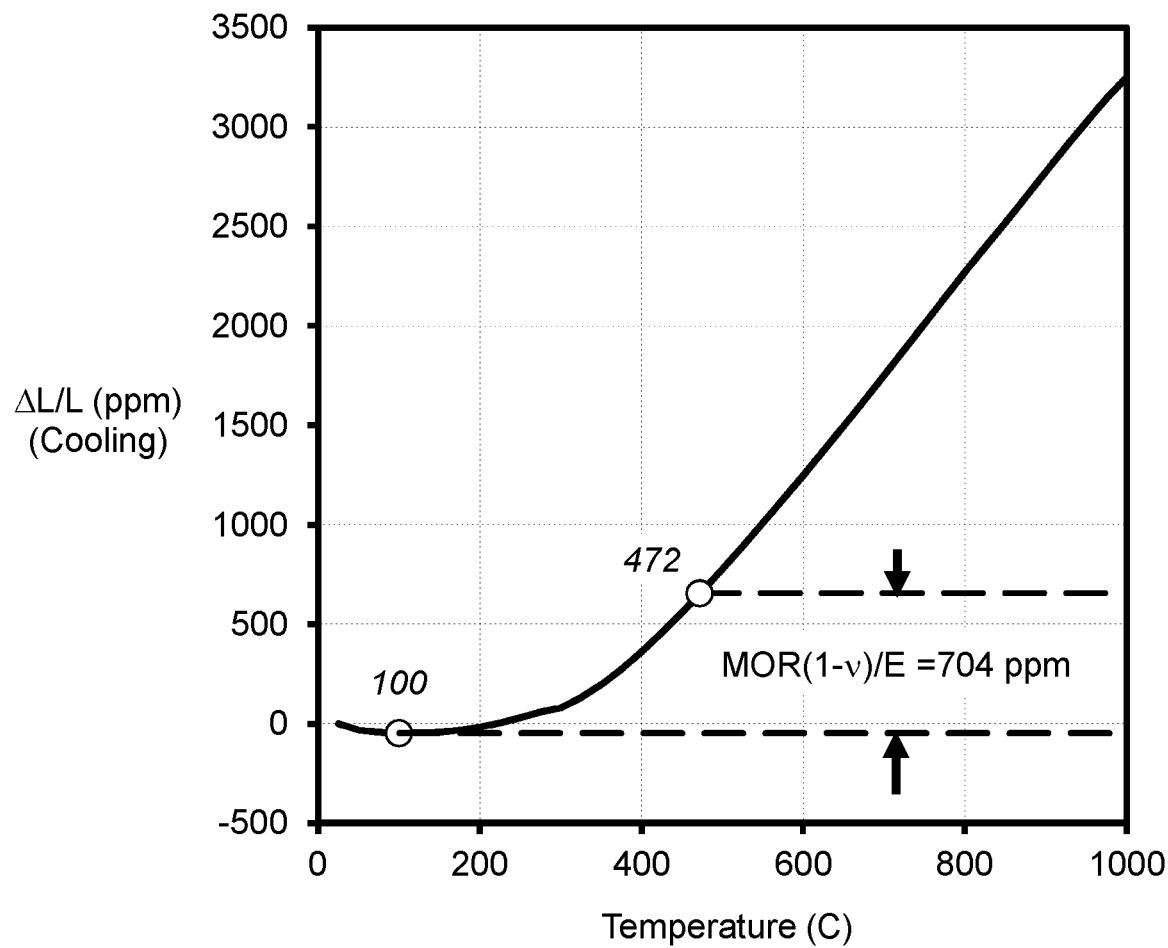
Figure 14:
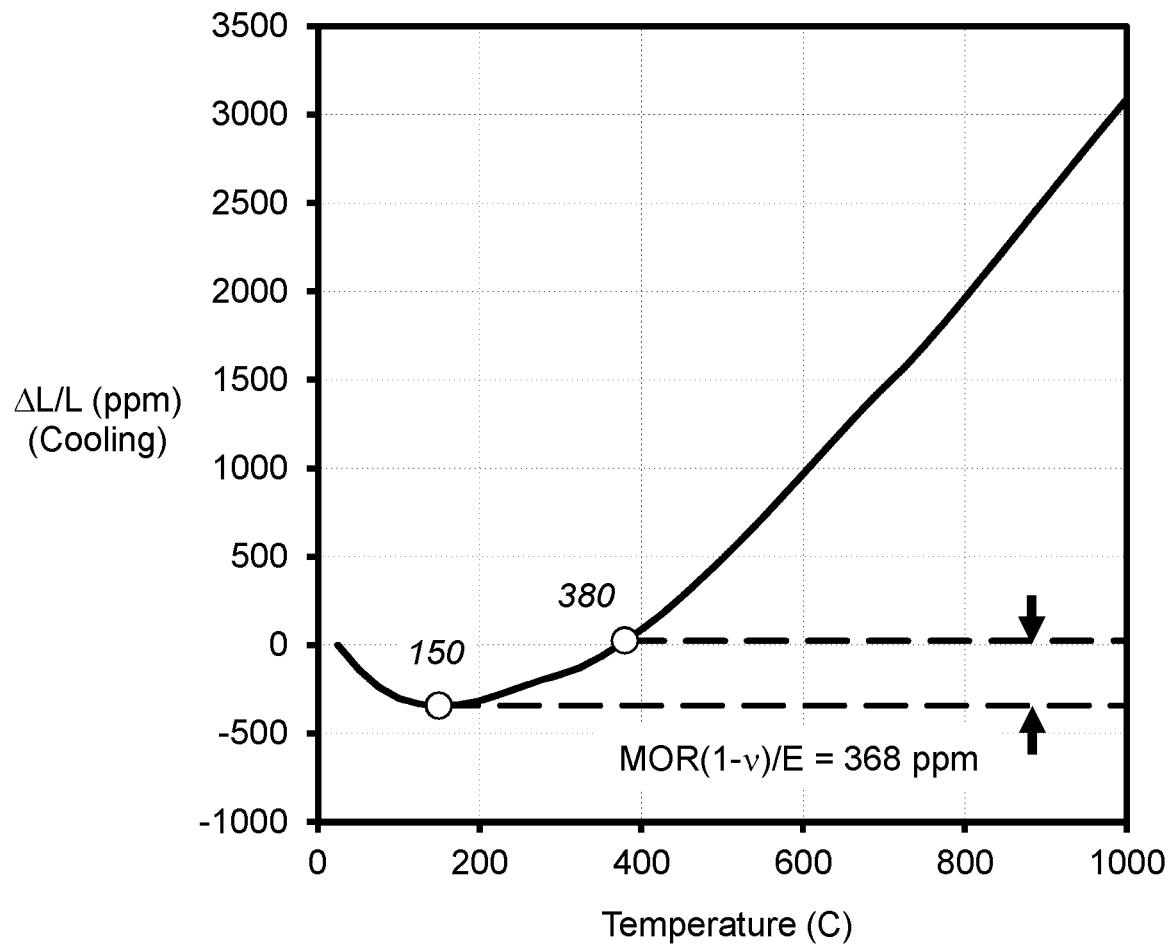

The extent of microcracking in the examples in Table 5 was also determined from measurement of the elastic modulus from room temperature to 1200° C. as described previously. Plots of E vs. T for examples D6a and M6a are provided in FIGS. 9 and 10, respectively, which illustrate the procedure for deriving the value of $E_{25}°$ required to compute $(Nb^3)_{EM}$ from Eq. 2. The microcrack indices, $(Nb^3)_{EM}$, determined in this way also meet the requirements of the exemplary embodiments of the present disclosure for which $CTE_{min}$ of the zirconium tin titanate phase is not more than $30 \times 10^{-7}$ $C.^{-1}$.

TABLE 4

Properties of comparative and exemplary examples fired at 1600° C. (first 1600° C. firing)

| | Example Code | | | | | | | | | |
|---|---|---|---|---|---|---|---|---|---|---|
| | D6 | E6 | F6 | G6 | H6 | L6 | M6 | O6 | P6 | Q6 |
| | Example Type | | | | | | | | | |
| Composition Code | Comp D | Comp E | Exem F | Comp G | Comp H | Exem L | Exem M | Comp O | Exem P | Exem Q |
| Nominal Composition | | | | | | | | | | |
| Zr per 4 ox | 1.00 | 1.00 | 1.00 | 0.75 | 0.75 | 1.00 | 1.00 | 1.20 | 1.20 | 1.20 |
| Ti per 4 ox | 1.00 | 0.70 | 0.40 | 1.00 | 0.75 | 0.30 | 0.20 | 0.60 | 0.40 | 0.20 |
| Sn per 4 ox | 0.00 | 0.30 | 0.60 | 0.25 | 0.50 | 0.70 | 0.80 | 0.20 | 0.40 | 0.60 |
| Composition Derived from Lattice Parameters | | | | | | | | | | |
| Zr per 4 ox | 1.00 | 1.01 | 0.99 | 0.74 | 0.77 | 0.98 | 1.01 | 1.20 | 1.15 | 1.13 |
| Ti per 4 ox | 1.00 | 0.70 | 0.40 | 1.00 | 0.75 | 0.30 | 0.20 | 0.61 | 0.41 | 0.23 |
| Sn per 4 ox | 0.00 | 0.30 | 0.61 | 0.26 | 0.48 | 0.72 | 0.79 | 0.19 | 0.44 | 0.65 |

TABLE 4-continued

Properties of comparative and exemplary examples fired at 1600° C. (first 1600° C. firing)

| | Example Code | | | | | | | | | |
|---|---|---|---|---|---|---|---|---|---|---|
| | D6 | E6 | F6 | G6 | H6 | L6 | M6 | O6 | P6 | Q6 |
| | Example Type | | | | | | | | | |
| Composition Code | Comp D | Comp E | Exem F | Comp G | Comp H | Exem L | Exem M | Comp O | Exem P | Exem Q |
| Weight Percentages by XRD | | | | | | | | | | |
| Zirconium Titanate | 100 | 0 | 0 | 0 | 0 | 0 | 0 | 0 | 0 | 0 |
| Zirconium Tin Titanate | 0 | 100 | 99.6 | 100 | 100 | 96.6 | 92.3 | 94.2 | 93.7 | 88.2 |
| Tin Oxide | 0 | 0 | 0.4 | 0 | 0 | 0 | 3.9 | 0 | 0.3 | 0 |
| Monoclinic Zirconium Oxide | 0 | 0 | 0 | 0 | 0 | 3.4 | 3.8 | 5.8 | 6.0 | 11.8 |
| Lattice Parameter a (Å) | 4.8059 | 4.8290 | 4.8453 | 4.7564 | 4.7787 | 4.8500 | 4.8614 | 4.8745 | 4.8750 | 4.8823 |
| Lattice Parameter b (Å) | 5.4287 | 5.5408 | 5.6211 | 5.5321 | 5.5826 | 5.6408 | 5.6547 | 5.5076 | 5.5922 | 5.6420 |
| Lattice Parameter c (Å) | 5.0274 | 5.0792 | 5.1351 | 5.0392 | 5.0810 | 5.1531 | 5.1694 | 5.0835 | 5.1257 | 5.1646 |
| $CTE_{25-800}$ by dilatometry ($10^{-7}$ °C.$^{-1}$) | 74.6 | 59.1 | 26.2 | 66.8 | 57.6 | 26.4 | 25.5 | 41.5 | 16.3 | 29.7 |
| $CTE_{25-1000}$ by dilatometry ($10^{-7}$ °C.$^{-1}$) | 77.6 | 61.7 | 30.2 | 69.7 | 60.1 | 29.8 | 27.8 | 48.1 | 21.7 | 30.5 |
| Mean Lattice $CTE_{25-1000}$ ($10^{-7}$ °C.$^{-1}$) | 86.6 | 62.4 | 49.3 | 73.5 | 57.1 | 47.0 | 45.1 | 61.2 | 43.4 | 40.1 |
| Minimum Lattice $CTE_{25-1000}$ ($10^{-7}$ °C.$^{-1}$) | 69.3 | 37.9 | 2.4 | 58.3 | 35.9 | -1.5 | -7.0 | 38.3 | -23.4 | -26.5 |
| Maximum CTE Anisotropy | 34 | 47.6 | 99 | 27 | 52.3 | 105.6 | 115.2 | 43.6 | 136.8 | 143.6 |

TABLE 5

Properties of comparative and exemplary examples fired at 1600° C. (second 1600° C. firing)

| | Example Code | | | |
|---|---|---|---|---|
| | D6a | F6a | M6a | P6a |
| | Example Type | | | |
| Composition Code | Comp D | Exem F | Exem M | Exem P |
| Nominal Composition | | | | |
| Zr per 4 ox | 1.00 | 1.00 | 1.00 | 1.20 |
| Ti per 4 ox | 1.00 | 0.40 | 0.20 | 0.40 |
| Sn per 4 ox | 0.00 | 0.60 | 0.80 | 0.40 |
| Composition Derived from Lattice Parameters | | | | |
| Zr per 4 ox | 1.01 | 0.99 | 1.02 | 1.16 |
| Ti per 4 ox | 0.98 | 0.39 | 0.20 | 0.41 |
| Sn per 4 ox | 0.01 | 0.62 | 0.79 | 0.44 |
| Weight Percentages by XRD | | | | |
| Zirconium Tin Titanate | 100.0 | 93.7 | 89.7 | 90.4 |
| Tin Oxide | 0 | 0 | 3.4 | 0 |
| Monoclinic Zirconium Oxide | 0 | 6.3 | 7.0 | 9.6 |
| Lattice Parameter a (Å) | 4.8104 | 4.8445 | 4.8632 | 4.8767 |
| Lattice Parameter b (Å) | 5.4314 | 5.6231 | 5.6556 | 5.5931 |
| Lattice Parameter c (Å) | 5.0307 | 5.1360 | 5.1704 | 5.1275 |
| % Open Porosity | 8.0 | 9.7 | 15.9 | 7.8 |
| Median Pore Diameter (μm) | 0.11 | 0.92 | 1.90 | 0.12 |
| $CTE_{22-800}$ by dilatometry ($10^{-7}$ °C.$^{-1}$) | 74.0 | 26.8 | 25.7 | 15.6 |
| $CTE_{22-1000}$ by dilatometry ($10^{-7}$ °C.$^{-1}$) | 76.7 | 30.7 | 28.1 | 21.6 |
| Mean Lattice $CTE_{25-1000}$ ($10^{-7}$ °C.$^{-1}$) | 86.6 | 49.3 | 45.1 | 43.4 |
| Minimum Lattice $CTE_{25-1000}$ ($10^{-7}$ °C.$^{-1}$) | 69.3 | 2.4 | -7 | -23.4 |
| Maximum CTE Anisotropy | 34 | 99 | 115.2 | 136.8 |
| Approximate Grain Size by SEM (μm) | 31.6 | 7.8 | 5.5 | 4.3 |
| Microcrack Index, $Nb^3$ (Image Analysis) | 0.34 | 0.41 | 0.19 | 0.28 |
| $E_{25° C.}$ ($10^6$ psi) | 9.75 | 5.49 | 7.68 | 4.41 |
| $E_{1200° C.}$ ($10^6$ psi) | 15.8 | 14.1 | 13.8 | 13.6 |

TABLE 5-continued

Properties of comparative and exemplary examples fired at 1600° C. (second 1600° C. firing)

| | Example Code | | | |
|---|---|---|---|---|
| | D6a | F6a | M6a | P6a |
| | Example Type | | | |
| Composition Code | Comp D | Exem F | Exem M | Exem P |
| $E°_{25° C.}$ (10$^6$ psi) | 17.86 | 15.08 | 16.92 | 13.41 |
| Microcrack Index, Nb$^3$ (Elastic Modulus) | 0.25 | 0.36 | 0.31 | 0.38 |
| MOR (psi) | 4871 | 4104 | 6755 | 2028 |
| MOR/E (%) | 0.050% | 0.075% | 0.088% | 0.046% |
| Estimated Thermal Down-Shock Limit (° C.) | 100 | 391 | 472 | 380 |

TABLE 6

Crystal lattice coefficients of thermal expansion for zirconium tin titanate compositions fired at 1600° C.

| Formula of Zirconium Tin Titanate Phase | Composition Code | Lattice CTE$_{25-1000° C}$ Values (10$^{-7}$ ° C.$^{-1}$) | | | | |
|---|---|---|---|---|---|---|
| | | CTE(a) | CTE(b) | CTE(c) | CTE(avg) | ΔCTE$_{max}$ |
| ZrTiO$_4$ | D | 69.3 | 103.3 | 87.1 | 86.6 | 34.0 |
| ZrTi$_{0.7}$Sn$_{0.3}$O$_4$ | E | 85.5 | 37.9 | 63.7 | 62.4 | 47.6 |
| ZrTi$_{0.4}$Sn$_{0.6}$O$_4$ | F | 101.4 | 2.4 | 44.1 | 49.3 | 99.0 |
| Zr$_{0.75}$TiSn$_{0.25}$O$_4$ | G | 85.3 | 58.3 | 76.9 | 73.5 | 27.0 |
| Zr$_{0.75}$Ti$_{0.75}$Sn$_{0.5}$O$_4$ | H | 88.2 | 35.9 | 47.3 | 57.1 | 52.3 |
| ZrTi$_{0.3}$Sn$_{0.7}$O$_4$ | L | 104.1 | −1.5 | 38.4 | 47.0 | 105.6 |
| ZrTi$_{0.2}$Sn$_{0.8}$O$_4$ | M | 108.2 | −7.0 | 34.2 | 45.1 | 115.2 |
| Zr$_{1.20}$Ti$_{0.60}$Sn$_{0.20}$O$_4$ | O | 81.9 | 38.3 | 63.4 | 61.2 | 43.6 |
| Zr$_{1.15}$Ti$_{0.41}$Sn$_{0.44}$O$_4$ | P | 113.4 | −23.4 | 40.3 | 43.4 | 136.8 |
| Zr$_{1.13}$Ti$_{0.23}$Sn$_{0.64}$O$_4$ | Q | 117.1 | −26.5 | 29.8 | 40.1 | 143.6 |

According to exemplary embodiments of the present disclosure, the low coefficient of thermal expansion of the ceramic bodies is beneficial for the thermal shock resistance. For example, when a long cylindrical ceramic specimen that is at an initial temperature $T_2$ is suddenly cooled to a temperature $T_1$ at the surface, the surface is in tension, and the tensional stress, σ, is defined by the general equation:

$$\sigma = E\varepsilon/(1-\nu) \quad \text{(Eq 9)}$$

Where E is the elastic modulus of the ceramic, ε is the strain resulting from the shrinkage of the surface during cooling, and ν is Poisson's ratio. In the present case, the strain is defined by the difference between the length of the interior of the cylinder at $T_2$, $L_{T2}$, and the length that the surface of the cylinder would have at temperature $T_1$, $L_{T1}$, if it were unconstrained, relative to the initial length of the body at room temperature, $L°$:

$$\varepsilon = (L_{T2} - L_{T1})/L° \quad \text{(Eq 10)}$$

To express Equation (10) in terms of the measured thermal expansion of the material, the equation may be rewritten as follows:

$$\varepsilon = [(L_{T2} - L°) - (L_{T1} - L°)]/L° \quad \text{(Eq 11)}$$
$$= (\Delta L_{T2} - \Delta L_{T1})/L°$$
$$= (\Delta L/L°)_{T2} - (\Delta L/L°)_{T1}$$

It will be recognized that the two terms $(\Delta L/L°)_{T2}$ and $(\Delta L/L°)_{T1}$ in Equation (11) represent two points on the thermal expansion (ΔL/L vs. T) curve for the material in question, at the temperatures $T_2$ and $T_1$. At failure, the tensional stress may be approximated by the modulus of rupture, MOR:

$$MOR = E[(\Delta L/L°)_{T2} - (\Delta L/L°)_{T1}]/(1-\nu) \quad \text{(Eq 12)}$$

Rearranging gives:

$$[(\Delta L/L°)_{T2} - (\Delta L/L°)_{T1}] = MOR(1-\nu)/E \quad \text{(Eq 13)}$$

and $$(\Delta L/L°)_{T2} = (\Delta L/L°)_{T1} + MOR(1-\nu)/E \quad \text{(Eq 14)}$$

To derive the thermal shock limit $T_2$, the value of $T_1$ must first be selected, and is chosen to equal the temperature of the minimum on the ΔL/L vs. T curve, since this will result in the greatest strain for a given $T_2$. For a CTE curve with no minimum, the lowest value of $T_1$ on the ΔL/L vs. T curve is room temperature (RT), which is about 25° C. The upper temperature limit $T_2$, which is the "thermal shock limit" for a cylinder of the ceramic, can then be found by (1) noting the value of (ΔL/L°) on the thermal expansion curve at $T_1$ (zero ppm when $T_1$=25° C.), (2) adding to that the calculated value of MOR(1−ν)/E, which yields the value of ΔL/L° at $T_2$; and (3) locating the position of that ΔL/L° value on the ΔL/L vs. T curve to identify the temperature, $T_2$, that corresponds to that point.

The thermal shock limits derived in this way are provided in Table 5 and the curves used in their construction are depicted in FIGS. 11, 12, 13, and 14 for examples D6a, F6a, M6a, and P6a. A value of 0.20 for the Poisson's ratio was utilized in the calculations of these microcracked materials. Calculations were made using the cooling CTE curves for each sample. The predicted thermal shock limit for comparative example D6a is 100° C. The reduction in CTE among the exemplary examples of tin-containing compositions results in an increase in the predicted thermal shock limit to between 380 and 475° C., substantially greater than that of the comparative example.

Low-expansion zirconium tin titanate ceramic bodies provided according to exemplary embodiments of the disclosure include a very high melting point (superior to cordierite-containing ceramics), thermodynamic stability from room temperature to at least 1600° C. (in contrast to aluminum titanate, which is metastable below 1300° C.), and the absence of a silicate phase (such as is present in cordierite, mullite+aluminum titanate, Sr-feldspar+aluminum titanate, and cordierite+aluminum titanate ceramics) that could react with catalysts or ash deposits when the inventive body is used as a catalytic converter or exhaust gas particulate filter. Low-expansion zirconium tin titanate ceramic bodies provided according to exemplary embodiments of the disclosure may also be expected to exhibit excellent dimensional stability with repeated thermal cycling to high temperatures.

It will be apparent to those skilled in the art that various modifications and variations can be made in the present disclosure without departing from the spirit or scope of the disclosure. Thus, it is intended that the appended claims cover the modifications and variations of this disclosure provided they come within the scope of the appended claims and their equivalents.

The invention claimed is:

1. A microcracked ceramic body, comprising:
   greater than 50 wt % of a zirconium tin titanate phase;
   a microcrack density; and
   a dilatometric coefficient of thermal expansion (CTE) from 25 to 1000° C. of not more than $40 \times 10^{-7}$° $C.^{-1}$ as measured by dilatometry.

2. The ceramic body of claim 1, wherein the dilatometric CTE from 25 to 1000° C. is not more than $30 \times 10^{-7}$° $C.^{-1}$.

3. The ceramic body of claim 1, wherein the dilatometric CTE from 25 to 1000° C. is not more than $25 \times 10^{-7}$° $C.^{-1}$.

4. The ceramic body of claim 1, wherein the minimum lattice axial CTE ($CTE_{min}$) of the zirconium tin titanate phase is $\leq 30 \times 10^{-7}$° $C.^{-1}$.

5. The ceramic body of claim 4, wherein the $CTE_{min}$ of the zirconium tin titanate phase is $\leq 0 \times 10^{-7}$° $C.^{-1}$.

6. The ceramic body of claim 1, wherein the $CTE_{min}$ of the zirconium tin titanate phase is $\leq -20 \times 10^{-7}$° $C.^{-1}$.

7. The ceramic body of claim 1, wherein the zirconium tin titanate phase is at least 80 wt % of the ceramic body.

8. The ceramic body of claim 1, wherein the zirconium tin titanate phase is at least 95 wt % of the ceramic body.

9. The ceramic body of claim 1, wherein the zirconium tin titanate phase is at least 99 wt % of the ceramic body.

10. The ceramic body of claim 1, wherein the mol % of each of $ZrO_2$, $SnO_2$ and $TiO_2$ components in the zirconium tin titanate phase is expressed as $40 \leq Z \leq 65$, $13 \leq S \leq 50$, and $5 \leq T \leq 30$, where $Z=100(\text{mol } \% \ ZrO_2)/(\text{mol } \% \ ZrO_2+\text{mol } \% \ SnO_2+\text{mol } \% \ TiO_2)$, $S=100(\text{mol } \% \ SnO_2)/(\text{mol } \% \ ZrO_2+\text{mol } \% \ SnO_2+\text{mol } \% \ TiO_2)$, and $T=100(\text{mol } \% \ TiO_2)/(\text{mol } \% \ ZrO_2+\text{mol } \% \ SnO_2+\text{mol } \% \ TiO_2)$.

11. The ceramic body of claim 10, wherein $40 \leq Z \leq 63$, $15 \leq S \leq 45$, and $5 \leq T \leq 27$.

12. The ceramic body of claim 1,
   wherein the microcrack density $Nb^3$ is expressed as
      $Nb^3 \geq k_1[0.102+6.00 \times 10^4(CTE_{min})+1.23 \times 10^{10}(CTE_{min})^2+8.38 \times 10^{14}(CTE_{min})^3]$,
   wherein $k_1$ is at least 1.0,
   wherein the microcrack density $Nb^3$ is at least one of $(Nb^3)IA$ and $(Nb^3)EM$, and
   wherein $(Nb^3)_{IA}$ is the microcrack density $Nb^3$ determined by image analysis and $(Nb^3)_{EM}$ is the microcrack density $Nb^3$ determined by Young's modulus,
   wherein $CTE_{min}$ is a minimum lattice axial coefficient of thermal expansion (CTE) from 25 to 1000° C. of the zirconium tin titanate phase, and $CTE_{min}$ is in units of ° $C.^{-1}$.

13. The ceramic body of claim 12, wherein $k_1$ is at least 2.

14. The ceramic body of claim 12, wherein $k_1$ is at least 3.

15. The ceramic body of claim 1, wherein a grain size parameter in units of micrometers (μm), g, of the zirconium tin titanate phase fulfills the expression $g \geq k_2[4.15+1.99 \times 10^6 (CTE_{min})+3.58 \times 10^{11}(CTE_{min})^2+2.15 \times 10^{16}(CTE_{min})^3]$,
   wherein $k_2$ is at least 1, $CTE_{min}$ is a minimum lattice axial coefficient of thermal expansion (CTE) from 25 to 1000° C. of the zirconium tin titanate phase, $CTE_{min}$ is in units of ° $C.^{-1}$, and the grain size is determined by a line intercept method applied to an image of the ceramic microstructure and is defined as $g=L/p$ where p is the number of grain boundaries intercepted by one or more straight lines of total length L or one or more circles of total circumference L, wherein L is in units of micrometers and L is chosen such that the value of L/g is at least 25 in order to provide adequate counting statistics for calculation of the grain size parameter.

16. The ceramic body of claim 15, wherein $k_2$ is at least 1.5.

17. The ceramic body of claim 15, wherein $k_2$ is at least 2.

18. A microcracked ceramic body, comprising:
   a predominant phase of zirconium tin titanate;
   a microcrack density; and
   a dilatometric coefficient of thermal expansion (CTE) from 25 to 1000° C. of not more than $40 \times 10^{-7}$° $C.^{-1}$ as measured by dilatometry; and
   a zirconium oxide-based baddeleyite phase that contains at least tin and titanium in solid solution, wherein the baddeleyite phase is characterized by a phase transformation from a monoclinic phase at low temperature to a tetragonal phase at higher temperature and wherein the transformation occurs below 1000° C.

19. The ceramic body of claim 1, further comprising a honeycomb structure comprising a plurality of axially extending end-plugged inlet and outlet cells.

20. A method of manufacturing a microcracked ceramic body, comprising:
   providing an inorganic batch composition comprising a zirconium oxide powder, a titanium oxide powder, and a tin oxide powder, wherein the median particle size of at least two of the oxide powders is at least 5 μm and wherein the sum of the weight percentages of the zirconium oxide powder, titanium oxide powder, and tin oxide powder is sufficient to provide more than 50 weight percent of a zirconium tin titanate phase in the microcracked ceramic body;

mixing the inorganic batch composition together with one or more processing aid selected from the group consisting of a plasticizer, lubricant, binder, pore former, and solvent, to form a plasticized ceramic precursor batch composition;

shaping the plasticized ceramic precursor batch composition into a green body; and firing the green body under conditions effective to convert the green body into the microcracked ceramic body comprising:

greater than 50 wt % of the zirconium tin titanate phase, wherein the mol % of each of $ZrO_2$, $SnO_2$ and $TiO_2$ components in the zirconium tin titanate phase is expressed as $40 \leq Z \leq 65$, $13 \leq S \leq 50$, and $5 \leq T \leq 30$, where $Z=100(\text{mol \% } ZrO_2)/(\text{mol \% } ZrO_2 + \text{mol \% } SnO_2 + \text{mol \% } TiO_2)$, $S=100(\text{mol \% } SnO_2)/(\text{mol \% } ZrO_2 + \text{mol \% } SnO_2 + \text{mol \% } TiO_2)$, and $T=100(\text{mol \% } TiO_2)/(\text{mol \% } ZrO_2 + \text{mol \% } SnO_2 + \text{mol \% } TiO_2)$;

wherein a minimum lattice axial CTE ($CTE_{min}$) from 25 to 1000° C. of the zirconium tin titanate phase is not more than $30 \times 10^{-7}$ °$C.^{-1}$; and wherein a zirconium tin titanate grain size parameter, g, in units of micrometers (μm) fulfills the expression $g \geq k_2[4.15 + 1.99 \times 10^6 (CTE_{min}) + 3.58 \times 10^{11}(CTE_{min})^2 + 2.15 \times 10^{16}(CTE_{min})^3]$, wherein $k_2 \geq 1$, $CTE_{min}$ is in units of °$C.^{-1}$, and the grain size is determined by a line intercept method applied to an image of the ceramic microstructure and is defined as $g=L/p$ where p is the number of grain boundaries intercepted by one or more straight lines of total length L or one or more circles of total circumference L, wherein L is in units of micrometers and L is chosen such that the value of L/g is at least 25 in order to provide adequate counting statistics for calculation of the grain size parameter.

* * * * *

UNITED STATES PATENT AND TRADEMARK OFFICE
CERTIFICATE OF CORRECTION

PATENT NO. : 10,882,794 B2
APPLICATION NO. : 15/763462
DATED : January 5, 2021
INVENTOR(S) : Gregory Albert Merkel It is certified that error appears in the above-identified patent and that said Letters Patent is hereby corrected as shown below:

On the Title Page

On page 2, in Column 1, item (56), Other Publications, Line 4, delete "Strucutres;" and insert -- Structures; --, therefor.

On page 2, in Column 2, item (56), Other Publications, Line 27, delete "Transistion" and insert -- Transition --, therefor.

On page 2, in Column 2, item (56), Other Publications, Line 29, delete "C18-C20," and insert -- C18-C20. --, therefor.

On page 2, in Column 2, item (56), Other Publications, Line 31, delete "Zirocnium" and insert -- Zirconium --, therefor.

On page 2, in Column 2, item (56), Other Publications, Line 39, delete "Dieelectric" and insert -- Dielectric --, therefor.

On page 2, in Column 2, item (56), Other Publications, Line 40, delete "Ceramices" and insert -- Ceramics --, therefor.

In the Claims

In Column 26, Line 9, Claim 12, delete "$(Nb^3)IA$ and $(Nb^3)EM$," and insert -- $(Nb^3)_{IA}$ and $(Nb^3)_{EM}$, --, therefor.

In Column 26, Line 17, Claim 12, delete "° C.-1." and insert -- $°C.^{-1}$. --, therefor.

Signed and Sealed this
Sixth Day of August, 2024

Katherine Kelly Vidal
*Director of the United States Patent and Trademark Office*